US012777467B2

(12) United States Patent
Wu et al.

(10) Patent No.: US 12,777,467 B2
(45) Date of Patent: Oct. 27, 2026

(54) RESOURCE ALLOCATION WITH COLLISION INDICATION FOR SIDELINK COMMUNICATION

(71) Applicant: QUALCOMM Incorporated, San Diego, CA (US)

(72) Inventors: Shuanshuan Wu, San Diego, CA (US); Gabi Sarkis, San Diego, CA (US); Parisa Cheraghi, Cambridge (GB); Arthur Gubeskys, San Diego, CA (US); Tien Viet Nguyen, Bridgewater, NJ (US); Stelios Stefanatos, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/000,151

(22) PCT Filed: Jul. 26, 2021

(86) PCT No.: PCT/US2021/043208

§ 371 (c)(1),
(2) Date: Nov. 29, 2022

(87) PCT Pub. No.: WO2022/026404

PCT Pub. Date: Feb. 3, 2022

(65) Prior Publication Data

US 2023/0247590 A1 Aug. 3, 2023

(30) Foreign Application Priority Data

Jul. 31, 2020 (GR) .............................. 20200100455

(51) Int. Cl.

*H04W 72/04* (2023.01)
*H04L 1/1812* (2023.01)

(Continued)

(52) U.S. Cl.

CPC ........... *H04W 72/04* (2013.01); *H04L 1/1812* (2013.01); *H04W 72/569* (2023.01); *H04W 74/0825* (2013.01)

(58) Field of Classification Search

CPC ............... H04W 72/04; H04W 72/569; H04W 74/0825; H04W 72/00; H04W 72/25;

(Continued)

(56) References Cited

U.S. PATENT DOCUMENTS

2020/0205166 A1* 6/2020 Huang ................ H04W 68/005
2020/0220669 A1 7/2020 Park (Continued)

FOREIGN PATENT DOCUMENTS

WO 2020011336 A1 1/2020
WO 2020092939 A1 5/2020

OTHER PUBLICATIONS

WO 2020/068973 A1 (Year: 2020).*

(Continued)

*Primary Examiner* — Rushil P. Sampat
(74) *Attorney, Agent, or Firm* — Patterson & Sheridan, L.L.P/ QUALCOMM INCORPORATED

(57) ABSTRACT

Certain aspects of the present disclosure provide techniques for resource allocation with collision indication for sidelink communication. A method that may be performed by a first user equipment (UE) includes receiving a first sidelink transmission from a second UE indicating a first resource reservation, receiving a second sidelink transmission from a third UE indicating a second resource reservation, and transmitting, to at least the second UE, feedback that includes hybrid automatic retransmission request (HARQ) feedback regarding the first sidelink transmission and an (Continued)

indication of whether a collision is detected by the first UE between the first resource reservation and the second resource reservation.

30 Claims, 17 Drawing Sheets

(51) Int. Cl.
*H04W 72/566* (2023.01)
*H04W 74/0808* (2024.01)

(58) Field of Classification Search
CPC ... H04W 72/10; H04W 72/56; H04W 68/005; H04W 72/02; H04W 72/0446; H04W 72/0453; H04W 76/27; H04W 92/18; H04L 1/1812; H04L 5/0094; H04L 1/1819; H04L 5/0053; H04L 5/0055; H04L 5/0058; H04L 5/0078
See application file for complete search history.

(56) References Cited

U.S. PATENT DOCUMENTS

| | | | | |
|---|---|---|---|---|
| 2021/0075552 | A1* | 3/2021 | Huang | H04L 1/1854 |
| 2021/0377912 | A1* | 12/2021 | El Hamss | H04L 1/1854 |
| 2023/0164578 | A1 | 5/2023 | Gubeskys et al. | |
| 2023/0189082 | A1 | 6/2023 | Stefanatos et al. | |
| 2023/0208690 | A1 | 6/2023 | Wu et al. | |
| 2023/0216612 | A1 | 7/2023 | Wu et al. | |
| 2023/0217487 | A1 | 7/2023 | Gubeskys et al. | |
| 2023/0224096 | A1 | 7/2023 | Gubeskys et al. | |
| 2023/0224965 | A1 | 7/2023 | Stefanatos et al. | |
| 2023/0232448 | A1 | 7/2023 | Stefanatos et al. | |
| 2023/0318757 | A1* | 10/2023 | Lee | H04L 1/189 370/329 |

OTHER PUBLICATIONS

Asia Pacific Telecom: "Discussion on SL Mode-2 Resource Allocation", 3GPP Draft, R1-1912250, 3GPP TSG-RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823321, 5 Pages, the Whole Document.

Fujitsu: "Discussion on Reservation and Sensing Based Resource Selection Methods for NR-V2X Sidelink Communication", 3GPP Draft, R1-1906439, 3GPP TSG RAN WG1 #97, 3rd Generation Partnership Project (3GPP), Mobile Competence Centre, 650, Route Des Lucioles, F-06921 Sophia-Antipolis Cedex, France, vol. RAN WG1. No. Reno. USA, May 13, 2019-May 17, 2019, May 13, 2019 (May 13, 2019), XP051727889, 7 Pages, the Whole Document.

International Search Report and Written Opinion—PCT/US2021/043208—ISA/EPO—Nov. 17, 2021.

Mediatek Inc: "Physical Layer Procedures for Sidelink", 3GPP Draft, 3GPP TSG RAN WG1 #98bis, R1-1911070_V2X_Physical_Layer_Procedure_Final, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808822, 16 Pages, pp. 7-15, 3 HARQ in Sidelink.

3GPP TS 38.213: "3rd Generation Partnership Project, Technical Specification Group Radio Access Network, NR, Physical layer procedures for control (Release 16)", 3GPP TS 38.213, V16.2.0, Jun. 2020, 3 Pages, Section 16.3.

3GPP TS 38.214: "3rd Generation Partnership Project, Technical Specification Group Radio Access Network, NR, Physical Layer Procedures for Data (Release 16)", 3GPP TS 38.214, V16.2.0, Jun. 2020, 4 Pages, Section 8.1.4.

3GPP TS 38.300: 3rd Generation Partnership Project, Technical Specification Group Radio Access Network; NR, NR and NG-RAN Overall Description, Stage 2 (Release 16), 3GPP TS 38.300, V16.2.0, 2 Pages, Jul. 2020, Section 5.7.2.

3GPP TS 38.321: "3rd Generation Partnership Project, Technical Specification Group Radio Access Network, NR, Medium Access Control (MAC) protocol specification (Release 16)", 3GPP TS 38.321, V16.1.0, Jul. 2020, 7 Pages, Section 5.22.1.

* cited by examiner

RESOURCE ALLOCATION WITH COLLISION INDICATION FOR SIDELINK COMMUNICATION

CROSS-REFERENCE TO RELATED APPLICATIONS

This application is a national stage application under 35 U.S.C. 371 of PCT/US2021/043208, filed Jul. 26, 2021, which claims benefit of and priority to Greece Provisional Application No. 20/200,100455, filed Jul. 31, 2020, which are hereby assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide sidelink communications with interference avoidance feedback.

Certain aspects of the subject matter described in this disclosure can be implemented in a method for wireless communication by a first user equipment (UE). The method generally includes receiving a first sidelink transmission from a second UE indicating a first resource reservation; receiving a second sidelink transmission from a third UE indicating a second resource reservation; and transmitting, to at least the second UE, feedback comprising: hybrid automatic retransmission request (HARQ) feedback regarding the first sidelink transmission; and an indication of whether a collision is detected by the first UE between the first resource reservation and the second resource reservation.

Certain aspects of the subject matter described in this disclosure can be implemented in a method for wireless communication by a first user equipment (UE). The method generally includes transmitting a sidelink transmission to a second UE indicating a first resource reservation; and receiving, from the second UE, feedback comprising: HARQ feedback regarding the sidelink transmission; and an indication of whether a collision is detected by the second UE between the first resource reservation and a second resource reservation.

Certain aspects provide an apparatus for wireless communication. The apparatus generally includes a memory and a processor, which is coupled to the memory. The processor and the memory are configured to receive a first sidelink transmission from a first UE indicating a first resource reservation and receive a second sidelink transmission from a second UE indicating a second resource reservation. The processor and the memory are further configured to transmit, to at least the first UE, feedback comprising: HARQ feedback regarding the first sidelink transmission; and an indication of whether a collision is detected by the apparatus between the first resource reservation and the second resource reservation.

Certain aspects provide an apparatus for wireless communication. The apparatus generally includes a memory and a processor, which is coupled to the memory. The processor and the memory are configured to transmit a sidelink transmission to a first UE indicating a first resource reservation. The processor and the memory are further configured to receive feedback comprising: HARQ feedback regarding the sidelink transmission; and an indication of whether a collision is detected by the first UE between the first resource reservation and a second resource reservation.

Certain aspects provide an apparatus for wireless communication. The apparatus generally includes means for receiving a first sidelink transmission from a second UE indicating a first resource reservation; means for receiving a second sidelink transmission from a third UE indicating a second resource reservation; and means for transmitting, to at least the second UE, feedback comprising: HARQ feedback regarding the first sidelink transmission; and an indication of whether a collision is detected by the first UE between the first resource reservation and the second resource reservation.

Certain aspects provide an apparatus for wireless communication. The apparatus generally includes means for transmitting a sidelink transmission to a second UE indicating a first resource reservation; and means for receiving, from the second UE, feedback comprising: HARQ feedback regarding the sidelink transmission; and an indication of whether a collision is detected by the second UE between the first resource reservation and a second resource reservation.

Certain aspects provide a non-transitory computer-readable storage medium for wireless communication by an apparatus. The medium including instructions that, when executed by a processing system of the apparatus, cause the processing system to perform operations generally including receiving a first sidelink transmission from a second UE indicating a first resource reservation; receiving a second sidelink transmission from a third UE indicating a second resource reservation; and transmitting, to at least the second UE, feedback comprising: HARQ feedback regarding the first sidelink transmission; and an indication of whether a collision is detected by the first UE between the first resource reservation and the second resource reservation.

Certain aspects provide a non-transitory computer-readable storage medium for wireless communication by an apparatus. The medium including instructions that, when executed by a processing system of the apparatus, cause the processing system to perform operations generally including transmitting a sidelink transmission to a second UE indicating a first resource reservation; and receiving, from the second UE, feedback comprising: HARQ feedback regarding the sidelink transmission; and an indication of whether a collision is detected by the second UE between the first resource reservation and a second resource reservation.

Certain aspects of the subject matter described in this disclosure can be implemented in a method for wireless communication by a first user equipment (UE). The method generally includes attempting to decode a first sidelink transmission from a second UE; and transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission.

Certain aspects of the subject matter described in this disclosure can be implemented in a method for wireless communication by a first user equipment (UE). The method generally includes transmitting a first sidelink transmission to a second UE; and receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission.

Certain aspects provide a first wireless communication device. The first wireless communication device includes a memory and a processor. The memory and the processor are configured to attempt to decode a first sidelink transmission from a second UE. The memory and the processor are configured to transmit joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission.

Certain aspects provide a first wireless communication device. The first wireless communication device includes a memory and a processor. The memory and the processor are configured to transmit a first sidelink transmission to a second UE. The memory and the processor are configured to receive joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission.

Certain aspects provide a first wireless communication device. The first wireless communication device generally includes means for attempting to decode a first sidelink transmission from a second UE. The first wireless communication device further includes means for transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission.

Certain aspects provide a first wireless communication device. The first wireless communication device generally includes means for transmitting a first sidelink transmission to a second UE. The first wireless communication device further includes means for receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission.

Certain aspects provide a non-transitory computer-readable storage medium having instructions stored thereon for performing a method for wireless communication by a first wireless communication device. The method generally includes attempting to decode a first sidelink transmission from a second UE. The method further includes transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission.

Certain aspects provide a non-transitory computer-readable storage medium having instructions stored thereon for performing a method for wireless communication by a first wireless communication device. The method generally includes transmitting a first sidelink transmission to a second UE. The method further includes receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
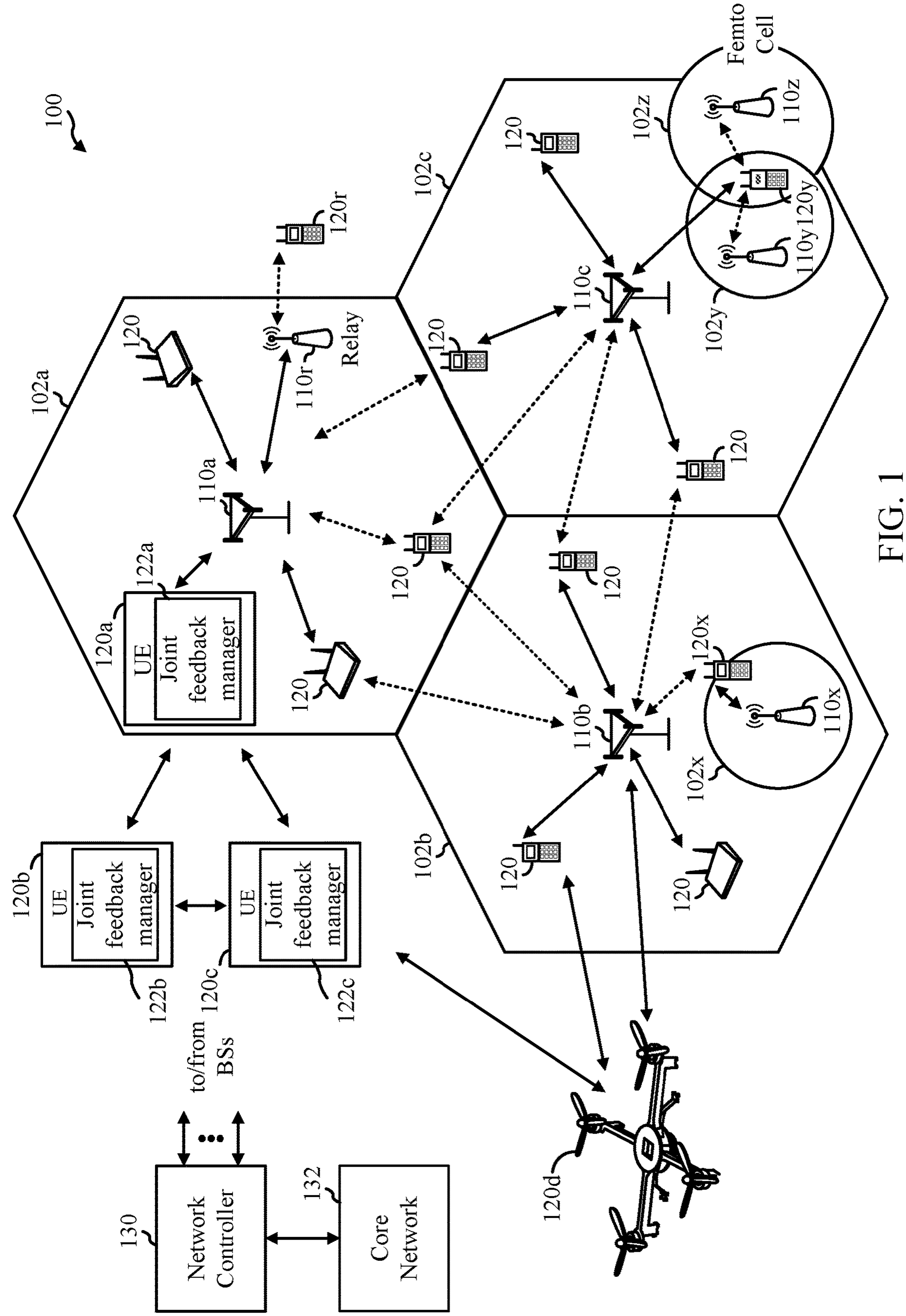
FIG. 1 is a block diagram conceptually illustrating an example wireless communication network, in accordance with certain aspects of the present disclosure.

Aspects of the present disclosure provide apparatus, methods, processing systems, and computer readable mediums for transmitting and receiving feedback (.g., joint feedback), for a sidelink communication, that includes hybrid automatic retransmission request (HARQ) feedback and an indication of whether a collision between a resource reservation indicated in the sidelink communication and another resource reservation indicated in another sidelink communication is detected. In certain aspects, such feedback may be referred to as joint feedback, for example where the HARQ feedback and the indication are communicated together in the joint feedback. As used herein, joint feedback may refer to two or more separate indications of feedback (such as HARQ feedback and an indication of whether there is a collision) included in a common message.

In certain aspects of the present disclosure, a user equipment (UE) may reserve a number of resources (e.g., subchannels of a frequency band) in future time periods (e.g., slots) for sidelink transmissions by the UE. For example, the UE may be operating in a cellular vehicle to everything (CV2X) communications system operating with Mode 2 resource allocation, where the UE reserves resources for itself, as opposed to Mode 1, where a base station allocates resources to the UE. The UE may inform other UEs of the reservations by indicating the reservations in sidelink control information (SCI) that the UE transmits. The UE may also learn of other reservations by other UEs by monitoring the SCIs transmitted by those other UEs, and the UE may avoid reserving resources that overlap in time and frequency with resources reserved by the other UEs. Such overlap may be a full overlap in time and frequency, or a partial overlap in time and frequency. Accordingly, such overlap refers to resources that overlap at least partially in time and frequency.

Despite trying to avoid reserving resources that overlap, more than one UE may reserve a same resource or other overlapping resources, such that the reservations of the more than one UE overlap. Such reservation of overlapping resources by more than one UE may be referred to as a collision between the resource reservations by the multiple UEs. In an example, a first UE and a second UE may not be able to decode signals from each other (e.g., due to path loss between the UEs). Accordingly, the first and second UEs may not be able to decode SCIs from one another indicating reserved resources, and therefore the first and second UEs may reserve overlapping resources. As the first and second UEs have path loss between one another, such use of overlapping resources may not cause interference at the first and second UEs directly. However, a third UE may be able to decode signals from both of the first and second UEs (e.g., the third UE is between the other UEs). Therefore, use of the same resources by the first and second UEs, such as for communicating with the third UE, may cause interference between transmissions from the first and second UEs as received at the third UE. In certain aspects, the third UE may detect that each of the first and second UEs have reserved overlapping resources. For example, the third UE receives SCIs from the first and second UEs reserving overlapping resources (e.g., the same resources, partially overlapping resources, etc.).

In another example, two UEs may reserve the same resource or other overlapping resources when the two UEs both identify the resource as available and reserve the resource simultaneously. In one example, such reservation may occur when the UEs are half-duplex and therefore unable to receive, in this case an SCI from another UE reserving the resource, and transmit, in this case an SCI reserving the resource by the UE, simultaneously. Similar to as discussed, however, a third UE may detect the collision by receiving the SCIs from the first and second UEs reserving the same or overlapping resources.

According to aspects of the present disclosure, a UE that detects a collision of resource reservations between multiple other UEs may transmit an indication of that collision (e.g., to other UE(s)) in feedback, such as using a HARQ feedback channel. In certain aspects of the present disclosure, a UE that detects a collision may transmit joint feedback comprising HARQ feedback and a collision indication to another UE(s) reserving one or more of the overlapping resources. In certain aspects, the other UE(s) may take steps to reduce or eliminate the impact of the collision (e.g., by deferring transmission or surrendering a reservation of one or more of the resources).

The joint feedback described herein may improve the reliability for sidelink communications, for example, due to the transmitting UE(s) taking one or more actions to avoid interference at the receiving UE. For example, if the joint feedback indicates that the collision is detected, a transmitting UE may refrain from transmitting during the resource reservation with the collision or use different resources for the sidelink transmission. The joint feedback described herein may reduce the interference encountered at the receiving UE, for example, due to the transmitting UE(s) refraining from transmitting or using different resources if the joint feedback indicates that a collision is detected. As a result, techniques discussed herein may improve latency of communications, as interference avoidance may reduce the number of retransmissions required for successful communication.

Example sidelink communications include vehicle-to-everything (V2X) communications. Though certain aspects may be discussed with respect to V2X communications in a V2X communications system, it should be noted that the aspects may equally apply to other suitable types of sidelink communications systems. In certain aspects, such communications may occur in an unlicensed spectrum or a licensed spectrum. An unlicensed spectrum refers to any frequency band(s) that are not subject to licensed use under regulatory practice, such that the frequency band(s) are open to use by any devices, and not just devices that have a license to use the particular frequency band(s).

The following description provides examples of feedback including HARQ and a collision indication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word “exemplary” is used herein to mean “serving as an example, instance, or illustration.” Any aspect described herein as “exemplary” is not necessarily to be construed as preferred or advantageous over other aspects.

The electromagnetic spectrum, such as in a licensed band, is often subdivided, based on frequency/wavelength, into various classes, bands, channels, etc. In 5G NR two initial operating bands have been identified as frequency range designations FR1 (410 MHz-7.125 GHz) and FR2 (24.25 GHZ-52.6 GHz). It should be understood that although a portion of FR1 is greater than 6 GHZ, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHZ-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term “sub-6 GHz” or the like if used herein may broadly represent frequencies that may be less than 6 GHZ, may be within FR1, or may include mid-band frequencies. Further, unless specifically stated otherwise, it should be understood that the term “millimeter wave” or the like if used herein may broadly represent frequencies that may include mid-band frequencies, may be within FR2, FR4, FR4-a or FR4-1, and/or FR5, or may be within the EHF band.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHZ or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for joint HARQ and collision indication feedback. A first UE 120*a* includes a joint feedback manager 122*a* that attempts to decode a first sidelink transmission from a second UE (e.g. UE 120*b*); and transmits joint feedback comprising hybrid automatic retransmission request (HARQ) feedback regarding the first sidelink transmission and an indication of whether a collision is detected by the UE 120*a* between a first resource reservation indicated in the first sidelink transmission and a second resource reservation indicated in a second sidelink transmission (e.g., from UE 120*c*), in accordance with aspects of the present disclosure. Additionally or alternatively, the joint feedback manager 122*a* receives a first sidelink transmission indicating a first resource reservation from the second UE 120*b* and a second sidelink transmission indicating a second resource reservation from the third UE 120*c*; and the joint feedback manager 122*a* transmits, to at least the second UE 120*b*, feedback comprising HARQ feedback regarding the first sidelink transmission and an indication of whether a collision is detected by the first UE between the first resource reservation and the second resource reservation. At the second UE 120*b*, the joint feedback manager 122*b* may transmit the first sidelink transmission to the first UE 120*a*; and receive the joint feedback from the first UE 120*a*. Each of the UEs 120*a*, 120*b* and 120*c* include a similar joint feedback manager 122*a*, 122*b* and 122*c*, respectively.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a “cell”, which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. In one example, a quadcopter, drone, or any other unmanned aerial vehicle (UAV) or remotely piloted aerial system (RPAS) 120*d* may be configured to function as a UE. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
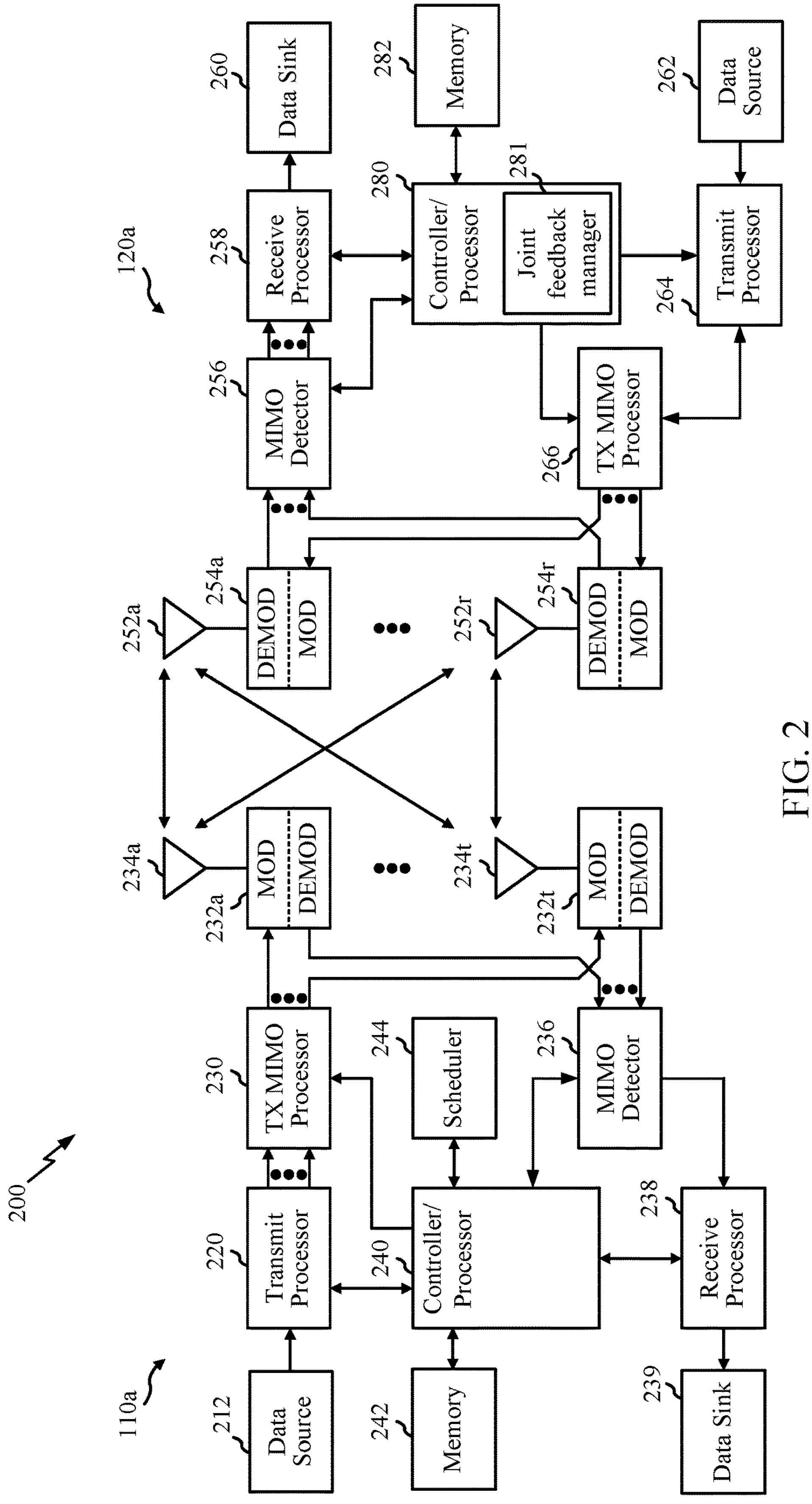
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a joint feedback manager 281 that may be representative of the joint feedback manager(s) 122a, 122b, and/or 122c, according to aspects described herein. Although shown at the controller/processor, other components of the UE 120a and BS 110a may be used to perform the operations described herein.

While the UE 120a is described with respect to FIG. 2 as communicating with a BS and/or within a network, the UE 120a may be configured to communicate directly with/transmit directly to another UE 120 (e.g., UEs 120b, 120c in FIG. 1), or with/to another wireless device without relaying communications through a network. In certain aspects, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
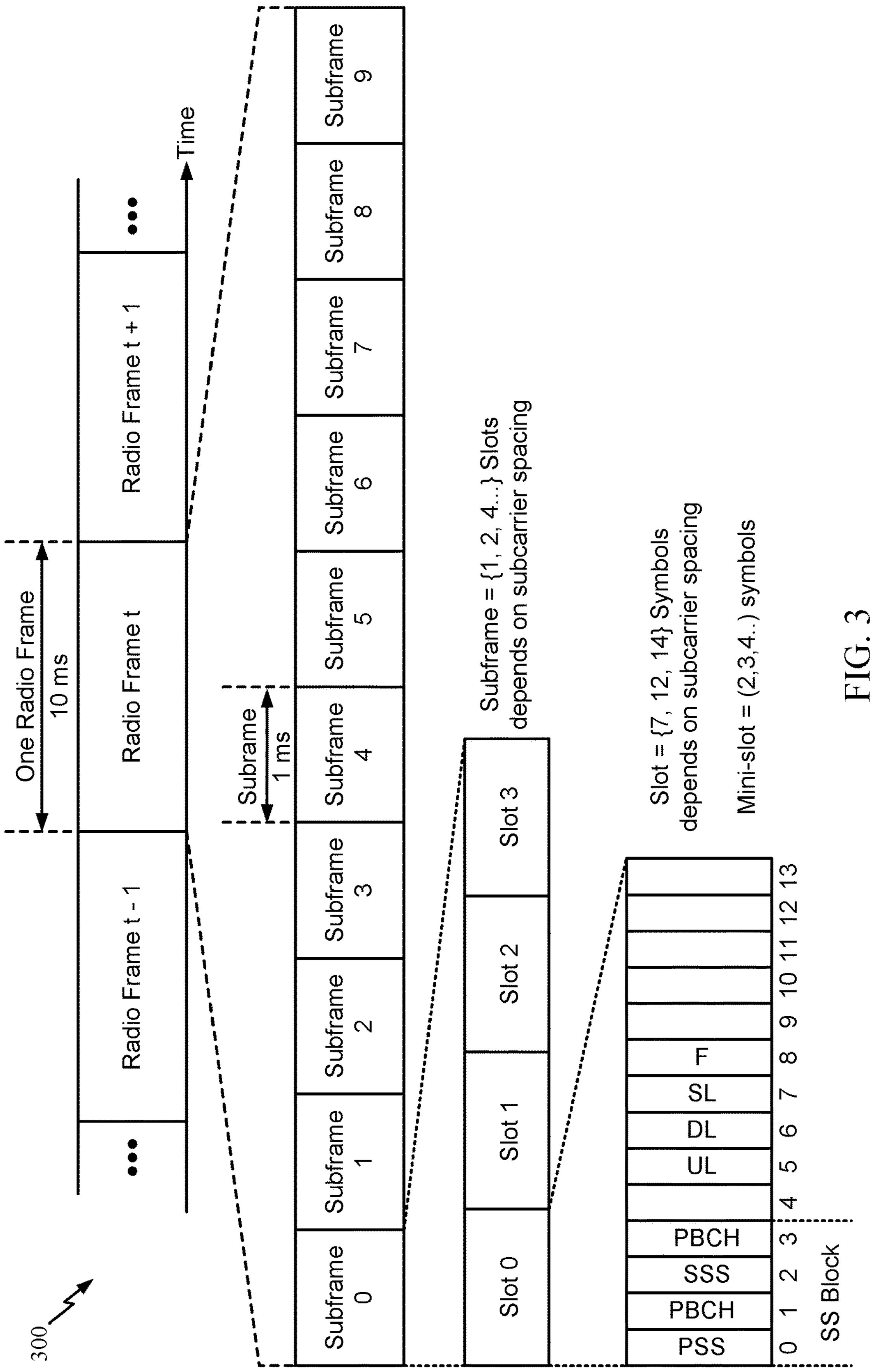
FIG. 3 is an example frame format for certain wireless communication systems (e.g., new radio (NR)), in accordance with certain aspects of the present disclosure.

FIG. 3 is a diagram showing an example of a frame format 300 for NR. The frame format 300 described herein may be used for sidelink communications. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, sidelink (SL), or flexible (F)) for data transmission and the link direction for each subframe may be dynamically switched. The link directions may be based on a certain slot format. Each slot may include DL/UL data as well as DL/UL control information. For sidelink communications, the SL symbol(s) may be associated with candidate resources and a selection window used to schedule specific time domain resources for sidelink transmission(s), for example, based on energy levels and/or reservations detected during a sensing window as further described herein with respect to FIG. 7.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4A:
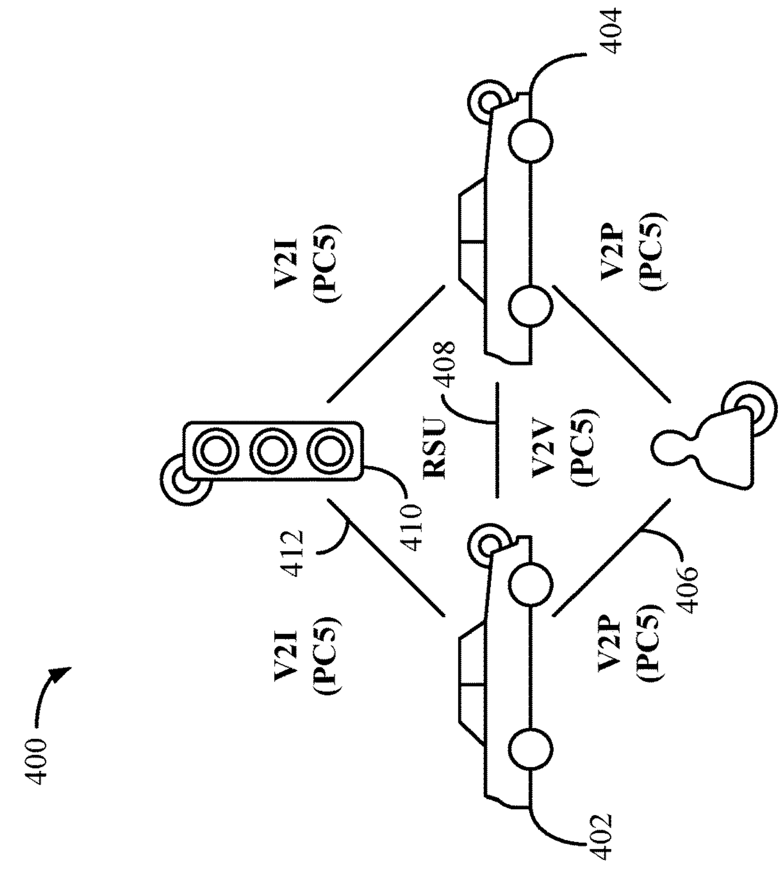
FIG. 4A and FIG. 4B show diagrammatic representations of example vehicle to everything (V2X) systems, in accordance with certain aspects of the present disclosure.
Figure 4B:
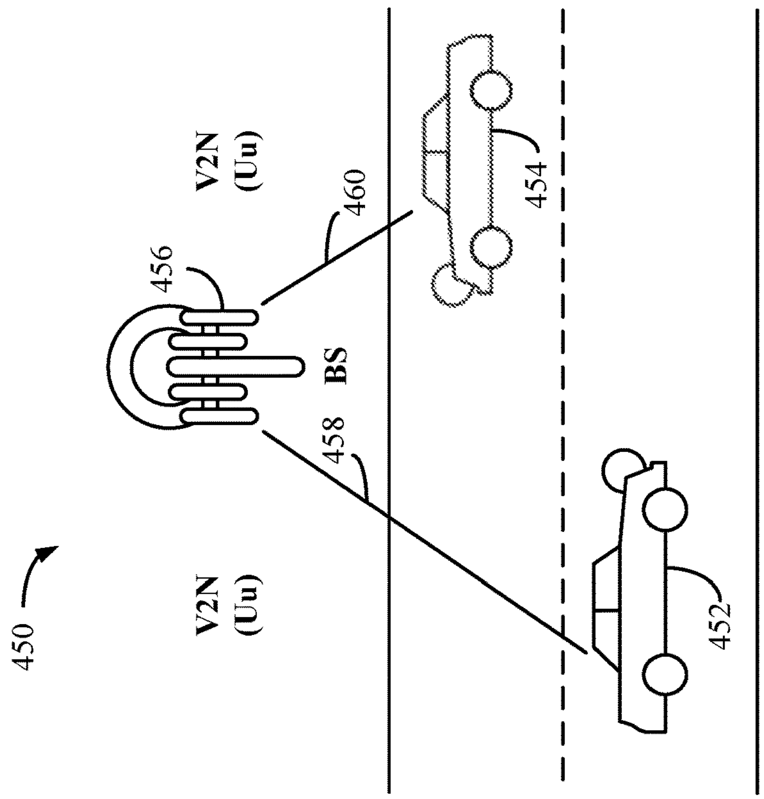

FIG. 4A and FIG. 4B show diagrammatic representations of example vehicle-to-everything (V2X) systems, in accordance with some aspects of the present disclosure. For example, the vehicles shown in FIG. 4A and FIG. 4B may communicate via sidelink channels and may relay sidelink transmissions as described herein.

The V2X systems provided in FIG. 4A and FIG. 4B provide two complementary transmission modes. A first transmission mode (also referred to as "mode 4"), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable spectral efficiency, reduced cost, and increased reliability as network service interruptions do not occur during handover operations for moving vehicles. The V2X system may be configured to operate in a licensed or unlicensed spectrum, thus, in certain aspects, any vehicle with an equipped system may access a common frequency and share information.

FIG. 4B shows a V2X system 450 for communication between a vehicle 452 and a vehicle 454 through a network entity 456. These network communications may occur through discrete nodes, such as a BS (e.g., the BS 110*a*), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 5:
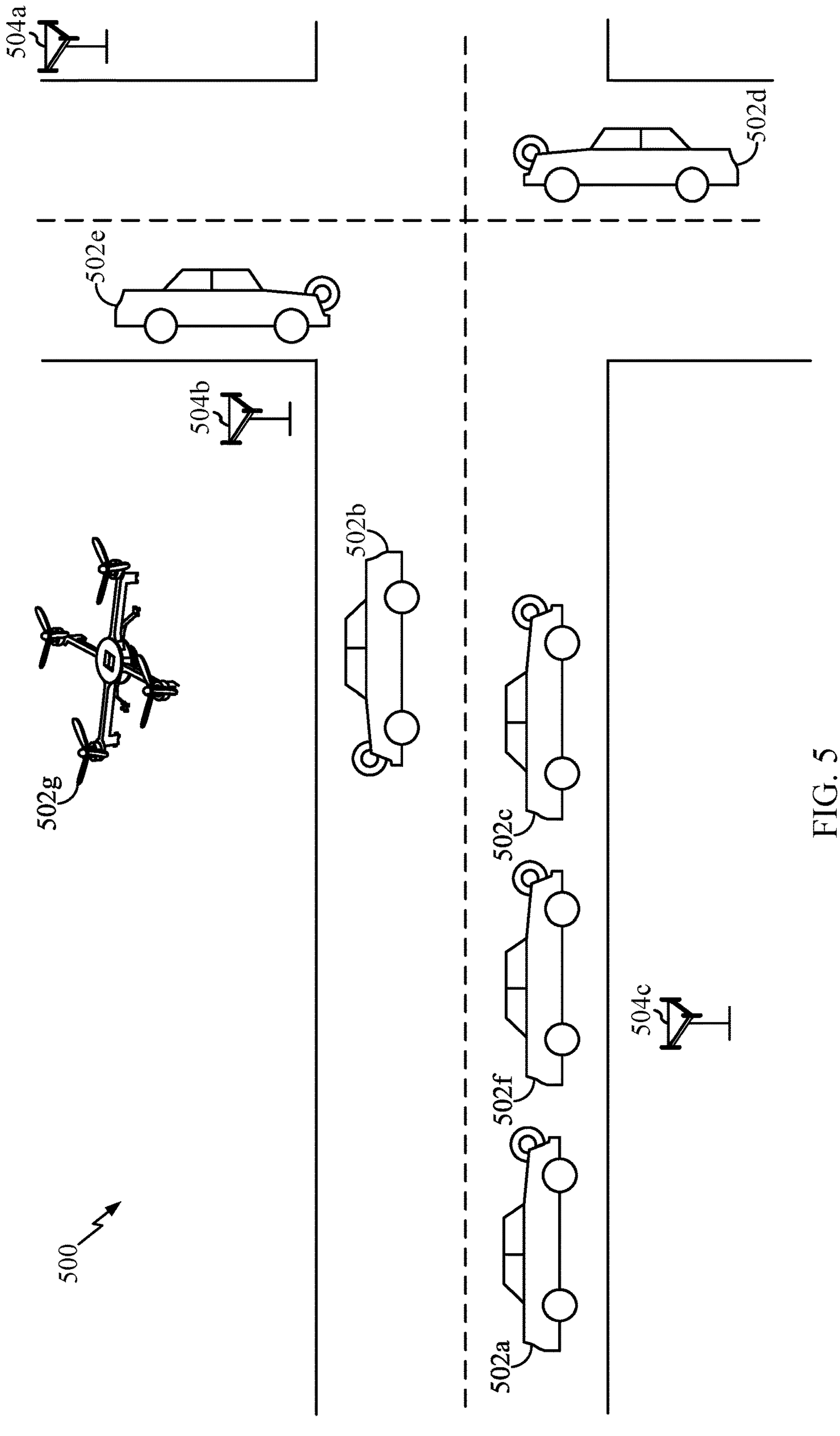
FIG. 5 is a schematic diagram illustrating an example network of multiple CV2X devices operating in an unlicensed spectrum, in accordance with certain aspects of the present disclosure.

FIG. 5 is a schematic diagram illustrating an example network 500 of multiple CV2X devices operating in an unlicensed spectrum. The unlicensed spectrum may be an example of a sidelink frequency band. Further, the network 500 may be an example of a sidelink communication system. The CV2X devices 502 may be configured to communicate on sidelink frequency channels as discussed herein. For example, any of the CV2X devices 502 may communicate with any other of the CV2X devices 502.

In the illustrated example, seven CV2X devices (e.g., a first CV2X device 502*a*, a second CV2X device 502*b*, a third CV2X device 502*c*, a fourth CV2X device 502*d*, a fifth CV2X device 502*e*, a sixth CV2X device 502*f*, and a seventh CV2X device 502*g*)-collectively referred to as CV2X devices 502) may operate in an unlicensed spectrum with other non-CV2X devices (e.g., non-CV2X devices 504*a-c*-collectively referred to as non-CV2X devices 504). In some examples, the first CV2X device 502*a*, the sixth CV2X device 502*f*, and the third CV2X device 502*c* may be part of a fleet or platoon. In transportation, platooning or flocking is a method for driving a group of vehicles together. It is meant to increase the capacity of roads via an automated highway system. Platoons decrease the distances between cars or trucks, such as based on sidelink communications.

Although the example provided is illustrative of six automotive CV2X devices in a traffic setting and a drone or other aerial vehicle CV2X device, it can be appreciated that CV2X devices and environments may extend beyond these, and include other wireless communication devices and environments. For example, the CV2X devices 502 may include UEs (e.g., UE 120 of FIG. 1) and/or road-side units (RSUs) operated by a highway authority, and may be devices implemented on motorcycles or carried by users (e.g., pedestrian, bicyclist, etc.), or may be implemented on another aerial vehicle such as a helicopter.

The CV2X devices 502 may include UEs (e.g., UE 120 of FIG. 1), and may be devices implemented on motorized vehicles (such as an automobile, motorcycle, etc.) or carried by users (e.g., pedestrian, bicyclist, etc.), or implemented as a roadside unit.

According to certain aspects of the present disclosure, a UE may reserve one or more time-frequency resources for a transmission (e.g., for re-transmission of a packet).

Figure 6:
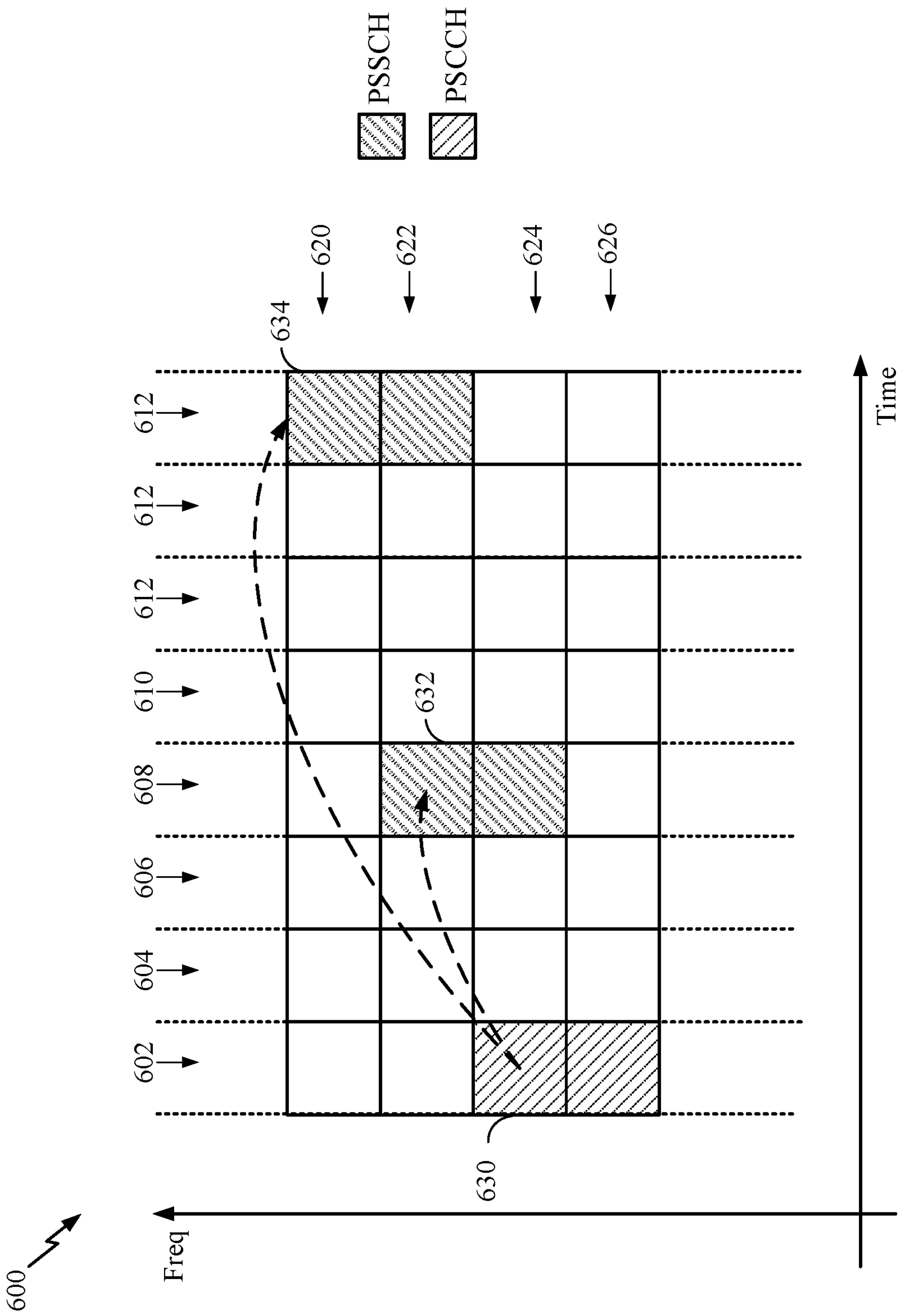
FIG. 6 is an example transmission timeline illustrating transmissions and resource reservations by a CV2X device, in accordance with certain aspects of the present disclosure.

FIG. 6 is an example transmission timeline 600 illustrating transmissions and resource reservations by a CV2X device, in accordance with aspects of the present disclosure. In the example transmission timeline, a UE (e.g., UE 120*a*, shown in FIG. 1) that is a CV2X device transmits a sidelink transmission 630 during a slot 602 on the subchannels 624 and 626. In certain aspects, the transmission includes data and control information that may be sent in a physical sidelink control channel (PSCCH), for example. The control information that the UE includes in transmission 630 reserves transmission resources on subchannels 622 and 624 during slot 608, as shown at 632. The control information in transmission 630 also reserves transmission resources on subchannels 620 and 622 during slot 612, as shown at 634. In certain aspects, the transmission resources may be reserved for retransmissions of the data in the sidelink transmission 630, for example. Though the sidelink transmission 630 is shown on two subchannels as an example, it should be noted the sidelink transmission may occur on any suitable number of one or more subchannels. Further, the control information may reserve any suitable number of one or more resources across any suitable number of subchannels and slots. A resource, in certain aspects, is a time-frequency resource.

In certain aspects, channel access and resource reservation may be based on sensing of a channel (e.g., comprising one or more subchannels) by a UE with data to transmit. In an example, the UE first identifies one or more available resources for sidelink transmission, which may be referred to as one or more candidate resources. The UE then selects one or more resources, from the one or more candidate resources, for transmission, such as for data and/or control information.

In certain aspects, to identify available resources, a UE monitors and attempts to decode one or more transmissions, e.g., all transmissions, on the channel. As discussed, a transmission may include control information indicating that another UE has reserved a resource. Thus, in certain aspects, the UE attempts to decode the one or more transmissions, and based on any control information in the one or more transmissions, determines resources that have been reserved. In certain aspects, the UE determines that any resources indicated as reserved in any control information are reserved resources.

In certain aspects, the UE also measures reference signal received power (RSRP) for each of the transmissions the UE attempts to decode. In certain aspects, even if a resource is indicated as reserved in the control information of a transmission, the UE only considers the resource to be a reserved resource if the transmission is received by the UE with a RSRP above a threshold. For example, should the transmission be received with a RSRP below the threshold, then the UE from which the transmission is received may be far enough from the UE receiving the transmission that it may not cause interference for both UEs to use the same resource. Conversely, in an example, should the transmission be received with a RSRP above the threshold, then the UE from which the transmission is received may be close enough from the UE receiving the transmission that it may cause interference for both UEs to use the same resource.

In certain aspects, the UE may consider other resources that are not reserved (e.g., within a time period and on the channel) as available or candidate resources for the UE to transmit a transmission. The UE may also reserve one or multiple resources of the candidate resources by transmitting control information reserving such one or more resources.

In certain aspects, when a packet arrives for transmission (e.g., arrives at a lower protocol layer from a higher protocol layer in a protocol stack of the UE), the UE determines a sensing window (e.g., a time period in the past). The UE may have received one or more transmissions during the sensing window, which may include control information. Accordingly, in certain aspects, the UE determines reserved resources as discussed based on transmissions received during the sensing window. In certain aspects, the UE then identifies available resources in a resource selection window (e.g., a time period in the future) based on any determined reserved resources. In certain aspects, by considering the RSRP of transmission in which control information is received, the UE in a sense projects measurement outcomes from the sensing window to corresponding reserved resource(s) in the selection window.

In certain aspects, to select a resource to use for a transmission, a UE may randomly select from the available resources.

Figure 7:
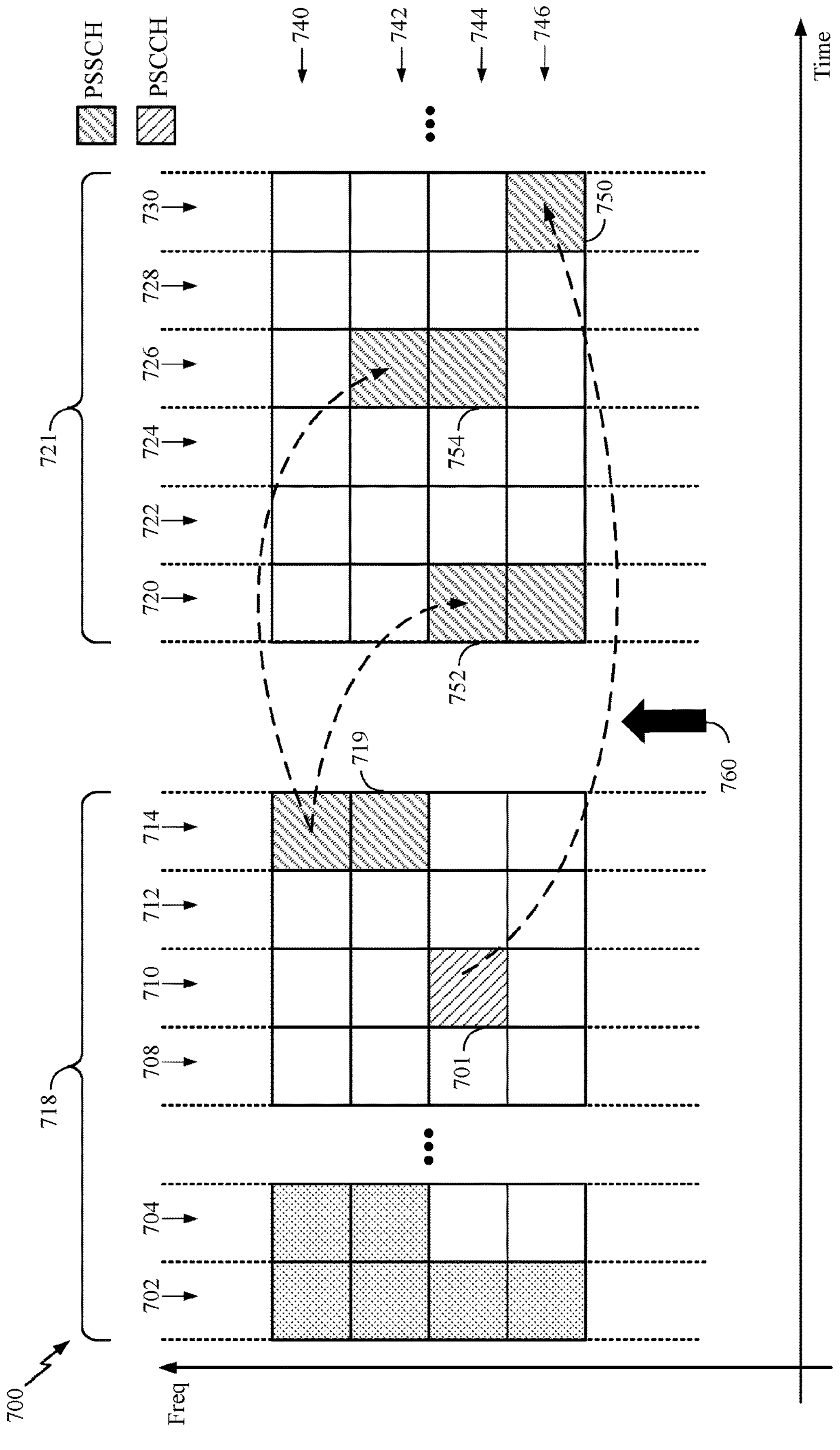
FIG. 7 is an example transmission timeline illustrating resource selection for transmission by a CV2X device, in accordance with certain aspects of the present disclosure.

FIG. 7 is an example transmission timeline 700, illustrating resource selection for transmission, for example, by a CV2X device. Though certain example numbers of transmissions, resources, and reservations are shown, one of skill in the art will understand that these are just examples, and any suitable number of transmissions, resources, and reservations may occur. The example transmission timeline includes slots 702, 704, 708, 710, 712, 714, 720, 722, 724, 726, 728, and 730, as well as sub-channels 740, 742, 744, and 746. In the example transmission timeline, a UE (e.g., UE 120*a*, shown in FIG. 1, which may be a CV2X device) attempts to decode control information in transmissions received during a sensing window 718. The UE determines that control information at 701 (in slot 710 on sub-channel 744) reserves transmission resources in a selection window 721 on sub-channel 746 during slot 730, as shown at 750. The control information at 719 (in slot 714 on sub-channels 740 and 742) reserves transmission resources on subchannels 744 and 746 during slot 720, as shown at 752, in accordance with aspects of the present disclosure. The control information at 719 also reserves transmission resources on subchannels 742 and 744 during slot 726, as shown at 754. The UE has a packet arrive for transmission at 760, and the UE may select resources in the selection window 721 that are not reserved or, in certain aspects, are reserved and the RSRP of the corresponding control information is less than a threshold.

In certain aspects, a sidelink communication system may use a HARQ feedback mechanism. For example, a first UE may transmit a transmission, and a second UE that received the transmission may send an acknowledgement (ACK) or a negative acknowledgement (NACK) to the first UE to indicate whether the second UE successfully decoded the data.

In certain aspects, HARQ feedback transmission (e.g., in a physical sidelink feedback channel (PSFCH)) may happen in a configured or preconfigured PSFCH resource, which may occur in every N slots, for example where N may be an integer (e.g., 0, 1, 2, or 4). In an example, the resource used for HARQ feedback transmission acknowledging a PSSCH is determined (e.g., determined by the UE transmitting the HARQ feedback) based on: the time and frequency resources of the PSSCH; the transmitter UE identifier (ID); the receiver UE ID, if the HARQ feedback is for ACK/NACK based groupcast communication; and/or the type of the feedback (e.g., ACK or NACK). In an example, each HARQ feedback is transmitted in one resource block (e.g., twelve consecutive subcarriers) and two OFDM symbols in a PSFCH slot.

In certain aspects, HARQ feedback may have two modes: a NACK-only mode and an ACK/NACK mode. In an example, the HARQ feedback may be NACK-only feedback, where a receiving UE sends a NACK when decoding of the data fails and sends nothing when decoding of the data is successful. In other words, the UE implicitly indicates that the transmission was successfully decoded by not transmitting the feedback. In another example, the HARQ feedback may be ACK/NACK feedback, where a receiving UE sends a NACK when decoding of the data fails and sends an acknowledgment (ACK) when decoding of the data is successful.

In certain aspects, there may be multiple PSFCH resources configured corresponding to a PSSCH transmission. In an example, multiple resources may be used for groupcast ACK/NACK feedback, so different receiving UEs in the group may each transmit feedback in a different PSFCH resource. In certain aspects, multiple transmitting UEs transmit data in the same resource. Accordingly, in certain aspects, multiple HARQ resources (e.g., the resources 830, 832, 930, 932 depicted in FIGS. 8B and 9) may be mapped to a given transmission resource, meaning multiple different HARQ resources are available to provide feedback regarding a give transmission in the transmission resource. The multiple HARQ resources may alleviate a potential collision between HARQ transmission by multiple UEs responding to the multiple transmissions in the resource.

Figure 8A:
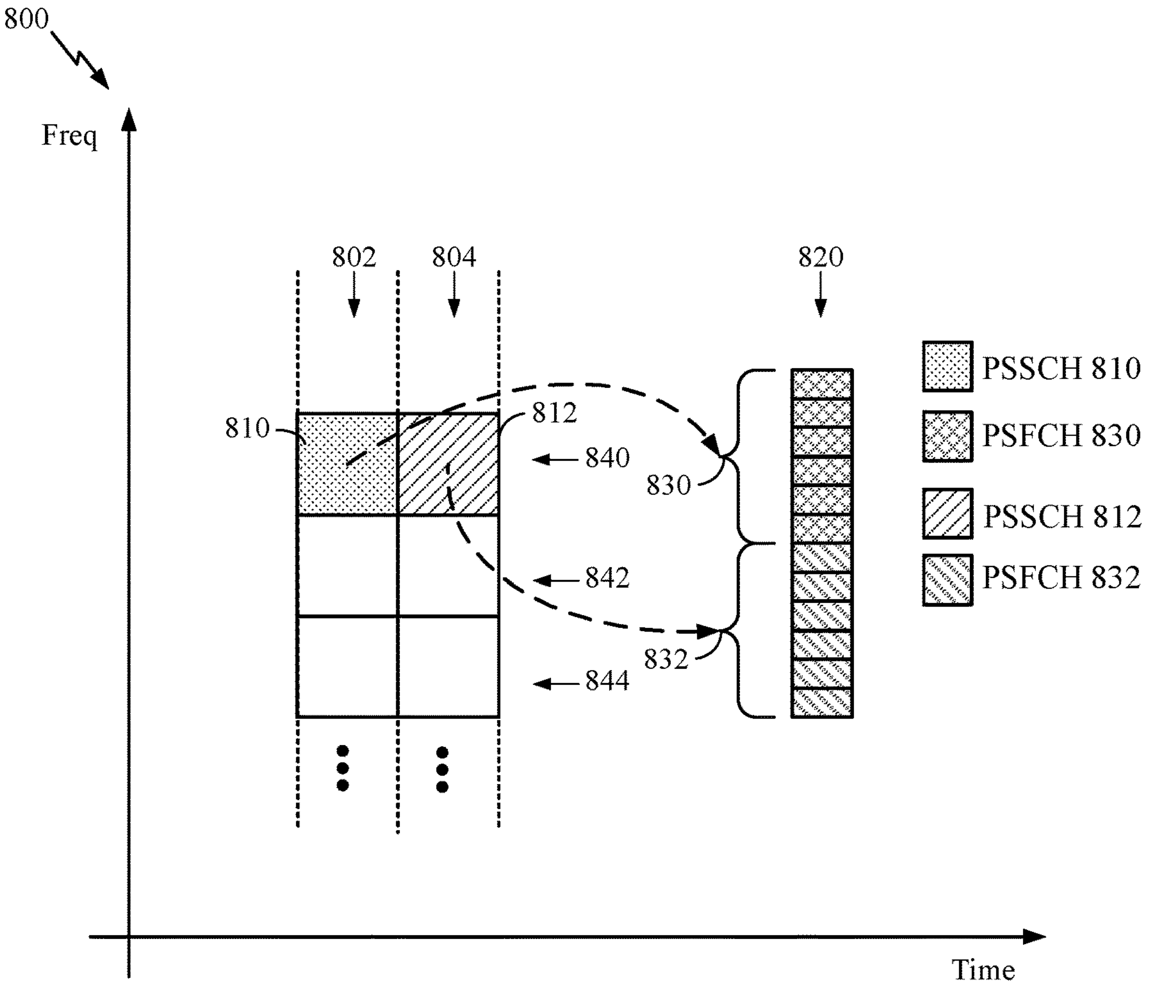
FIGS. 8A and 8B are example transmission timelines of sidelink communications, according to certain aspects of the present disclosure.
Figure 8B:
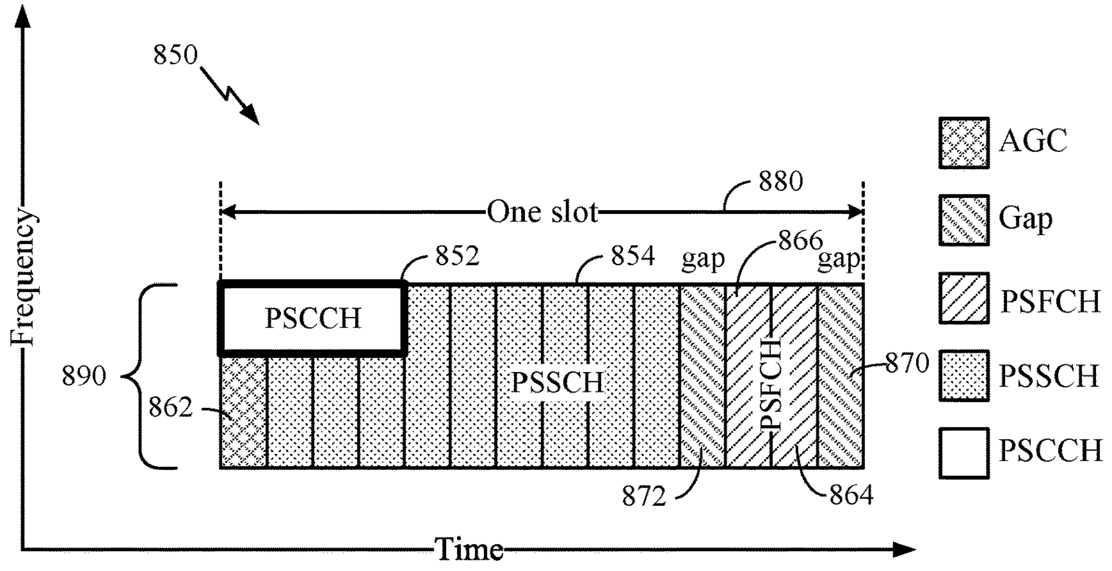

FIGS. 8A and 8B are example transmission timelines 800 and 850 of sidelink communications, according to aspects of the present disclosure. Though certain example numbers of transmissions, resources, and feedback, are shown, one of skill in the art will understand that these are just examples, and any suitable number of transmissions, resources, and reservations may occur. Referring to FIG. 8A, the example transmission timeline 800 includes slots 802 and 804, OFDM symbol 820, and sub-channels 840, 842, and 844. In the transmission timeline 800, a UE (e.g., UE 120*a*, shown in FIG. 1) transmits data via a sidelink channel (e.g., a physical sidelink shared channel (PSSCH)) at 810 and 812. Another UE (e.g., UE 120*b*, shown in FIG. 1) receives the data transmissions and transmits HARQ feedback for the transmissions during OFDM symbol 820. Each of the transmissions 810 and 812 has a corresponding set of configured resources 830 or 832 for the HARQ feedback in a PSFCH resource. In an example, each of the configured resources 830 and 832 includes six resource blocks during the OFDM symbol 820. The PSFCH resources may include frequency domain and code domain (e.g., cyclic shifted (CS)) resources.

Referring to FIG. 8B, in the transmission timeline 850, PSFCH resources are configured in the symbols 864 and 866 of a slot 880 on a sub-channel 890. A UE (e.g., UE 120*a*, shown in FIG. 1) transmits a PSCCH 852 that allocates other symbols in the slot 880 for a PSSCH 854. In certain cases, the UE may transmit an automatic gain control (AGC) signal in the OFDM symbol 862. Another UE, (e.g., UE 120*b*, shown in FIG. 1) receives the PSCCH and the PSSCH. The other UE transmits HARQ feedback regarding the PSSCH 854 on a PSFCH during the symbols 864 and/or 866. Both UEs may refrain from transmitting during the final symbol 870 (e.g., a gap symbol) of the slot and during the symbol 872 (e.g., another gap symbol) before (e.g., adjacent to in time and before) the symbol 866.

As discussed, multiple UEs may reserve the same/overlapping resource for sidelink transmission, which may result in interference at a receiving UE if multiple transmissions were made in the overlapping resource. If the sidelink transmissions collide, then a receiving UE may fail to decode the transmissions, causing the transmitting UEs to retransmit the sidelink transmissions.

Accordingly, it is desirable to develop techniques and apparatus for transmitting and receiving joint feedback, for a sidelink communication, that includes HARQ feedback and an indication of whether a collision between a resource reservation indicated in the sidelink communication and another resource reservation indicated in another sidelink communication is detected. Such an indication may be used to avoid a collision.

Example Resource Allocation with Collision Indication for Sidelink Communication Aspects of the present disclosure provide apparatus, methods, processing systems, and computer readable mediums for transmitting and receiving joint feedback, for a sidelink communication, that includes HARQ feedback and an indication of whether a collision between a resource reservation indicated in the sidelink communication and another resource reservation indicated in another sidelink communication is detected. As used herein, joint feedback may refer to two or more separate indications of feedback (such as HARQ feedback and an indication of whether there is a collision) included in a common message.

In aspects of the present disclosure, a UE transmitting sidelink transmissions may become aware of a potential collision with another sidelink communication based on the joint feedback, and take action to reduce or eliminate the impact of the potential collision. In examples, the transmitting UE may defer from transmitting on reserved resources or surrender the reserved resources in order to reduce or eliminate the impact of the potential collision.

According to aspects of the present disclosure, a UE receiving a sidelink communication (e.g., a data channel) may transmit joint feedback for the sidelink communication that includes HARQ feedback that indicates a decoding outcome of the sidelink communication as determined by the UE receiving the sidelink communication.

In aspects of the present disclosure, the joint feedback for the sidelink communication may include collision indication feedback that indicates whether a potential collision in a reserved resource has been detected.

The joint feedback described herein may improve the reliability for sidelink communications and/or reduce the interference encountered at a receiving UE for sidelink communications, for example, due to the transmitting UE(s) taking one or more actions to avoid the collision at the receiving UE. For example, if the joint feedback indicates that the collision is detected, the transmitting UE may refrain from transmitting to the receiving UE during the resource reservation with the collision or use different resources for the sidelink transmission to the receiving UE.

According to aspects of the present disclosure, a receiving UE may detect a collision (e.g., a collision in a reserved resource) by determining that another transmitting UE with a higher traffic priority is reserving the same resource or an overlapping resource. The traffic priority may be the priority indicated in sidelink control information from some or all of the transmitting UEs. The receiving UE may transmit the joint feedback to the transmitting UE with the lower traffic priority and/or the other transmitting UE with the higher traffic priority.

In aspects of the present disclosure, a receiving UE may detect a collision (e.g., a collision in a reserved resource) by determining that another transmitting UE is reserving the same resource or an overlapping resource, regardless of the traffic priority of the transmitting UEs.

According to aspects of the present disclosure, a receiving UE may determine if a resource has been reserved by a transmitting UE based on decoding sidelink control information (SCI), from the transmitting UE, indicating the resource to be reserved. The receiving UE may further determine if a resource has been reserved by a transmitting UE based on reference signal reserved power (RSRP) measurement of reference signal(s) (RS) as received by the receiving UE from the transmitting UE. In certain aspects, when RSRP of reference signal(s) from the transmitting UE is less than or equal to an RSRP threshold, then the receiving UE does not consider the resource as reserved and does not indicate a collision on the resource to the transmitting UE(s). In certain aspects, when RSRP of the reference signals from the transmitting UE is greater than the RSRP threshold, then the receiving UE does consider the resource as reserved and indicates a collision (e.g., by transmitting a collision indication in joint feedback) on the resource to the transmitting UE(s). For certain aspects, the receiving UE may transmit the joint feedback to the transmitting UE(s) based on any suitable technique used by the receiving UE to detect a collision.

In aspects of the present disclosure, a UE (e.g., UE 120*a*, shown in FIGS. 1-2) may transmit joint feedback (e.g., in response to a sidelink transmission) of 1 bit to indicate HARQ feedback type (e.g., ACK or NACK) and 1 bit to indicate whether a collision has been detected in reserved resources. In an example, each codepoint of 2 bits may be mapped to a specific feedback transmission time, frequency, and/or code resource (such as in the case of code division multiplexing). For example, a UE may convey the HARQ and/or collision indication by a time location of the feedback, frequency location of the feedback, and/or cyclic shift value of the feedback (e.g., 4 cyclic shifts for the 4 feedback types).

According to some aspects of the present disclosure, UEs operating according to a first communication standard (e.g., 3GPP NR Release 16 (Rel-16)) may transmit HARQ feedback via a first set of HARQ feedback resources configured for PSFCH transmission in sidelink, and UEs operating according to a second communication standard (e.g., 3GPP NR Release 17 (Rel-17)) may transmit HARQ feedback via the first set of HARQ feedback resources or another set of HARQ feedback resources configured for PSFCH transmission. In an example, UEs operating according to the second communication standard and receiving sidelink transmissions from other UEs operating according to the second communication standard may send HARQ feedback in the first set of HARQ feedback resources if there is no collision detected. The UEs operating according to the second communication standard may send HARQ feedback in the other set of HARQ feedback resources if a collision is detected. Thus, transmitting UEs operating according to the second communication standard may determine whether there is a collision based on the resource location in which the feedback has been detected, and transmitting UEs operating according to the first communication standard may detect HARQ feedback only in the first set of HARQ feedback resources. That is, in the example, the HARQ feedback time and/or frequency location conveys the 1-bit collision indication to transmitting UEs operating according to the second communication standard.

Figure 9:
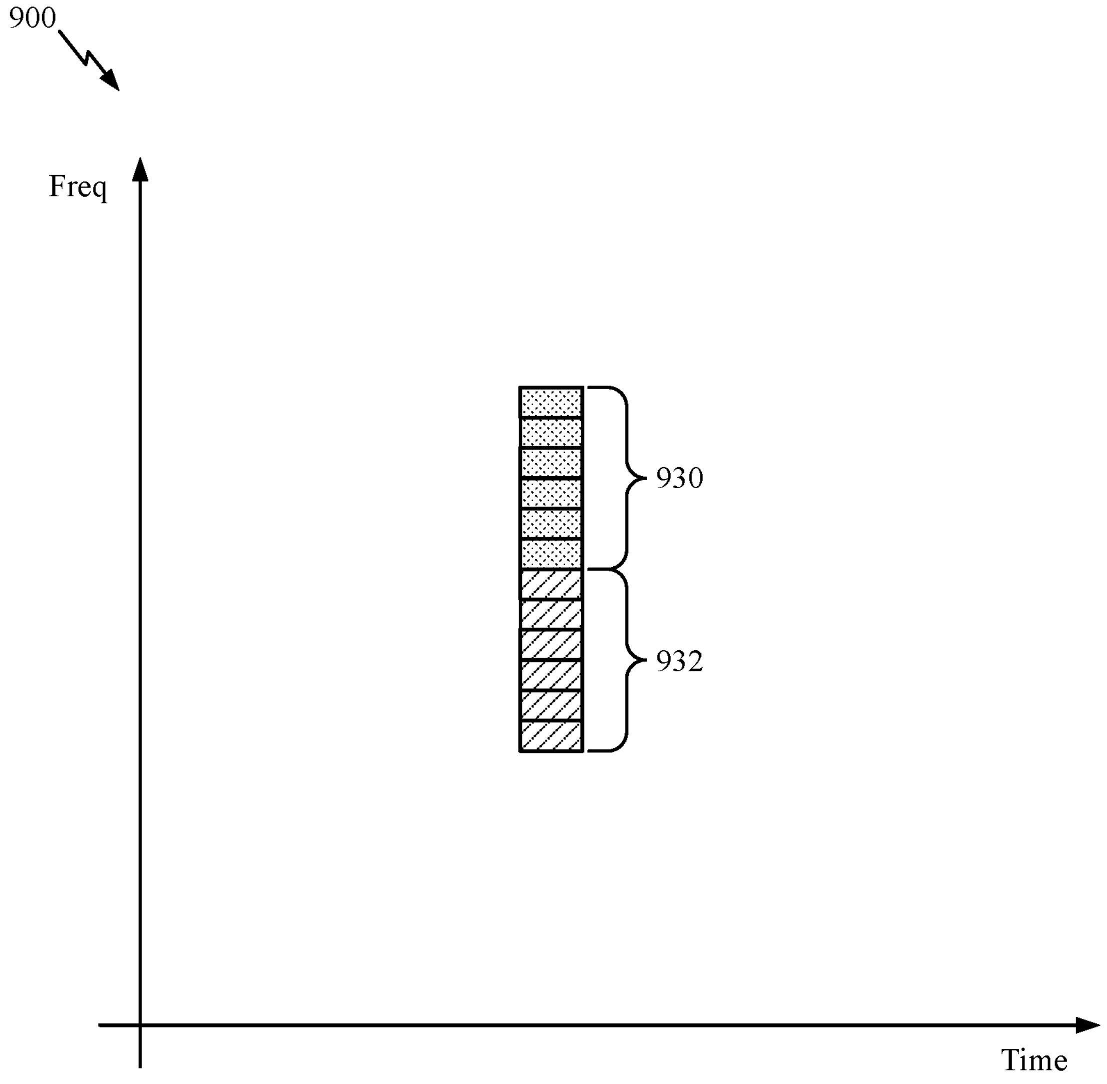
FIG. 9 is an example transmission timeline, according to certain aspects of the present disclosure.

FIG. 9 is an example transmission timeline 900, according to aspects of the present disclosure. In the example timeline, a first set of HARQ feedback resources 930 configured for UEs operating according to a first communication standard (e.g., 3GPP Release-16) may be configured in a legacy PSFCH slot(s) 906, but with different frequency locations from a second set of HARQ feedback resources 932 configured for UEs operating according to a second communication standard (e.g., 3GPP Release-17).

Figure 10:
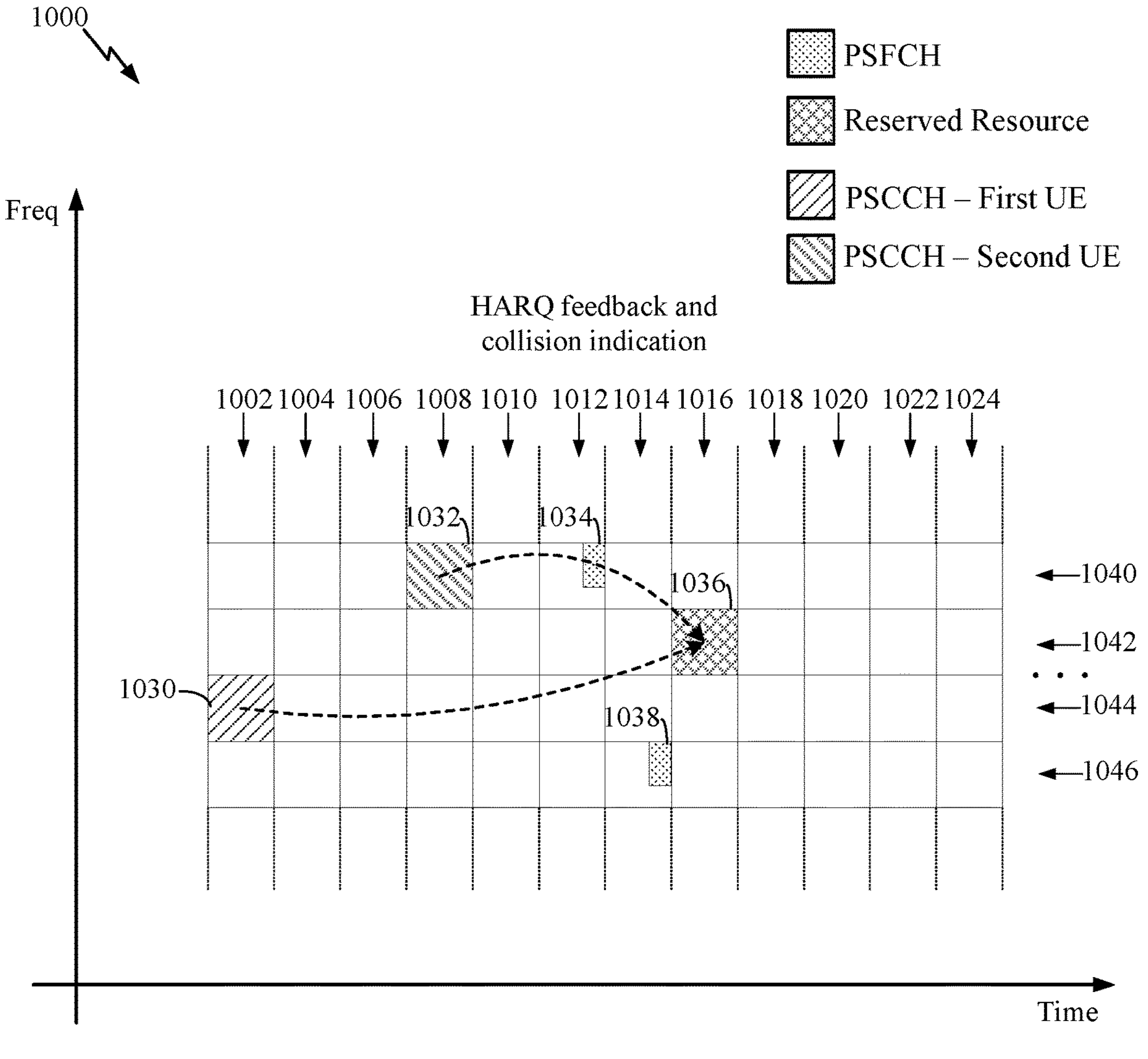
FIG. 10 is an example transmission timeline illustrating joint feedback including HARQ feedback and a collision indication, in accordance with certain aspects of the present disclosure.

FIG. 10 is an example transmission timeline 1000, illustrating joint feedback including HARQ feedback and a collision indication by a CV2X device, in accordance with aspects of the present disclosure. Though certain example numbers of transmissions, resources, and reservations are shown, one of skill in the art will understand that these are just examples, and any suitable number of transmissions, resources, and reservations may occur. The example transmission timeline includes slots 1002, 1004, 1006, 1008, 1010, 1012, 1014, 1016, 1018, 1020, 1022, and 1024, as well as sub-channels 1040, 1042, 1044, and 1046. In the example transmission timeline, a first UE (e.g., UE 120*a*, shown in FIG. 1, which may be a CV2X device) transmits a sidelink transmission 1030 during slot 1002 that reserves a resource 1036 in slot 1016 on sub-channel 1042. A second UE (e.g., UE 120*b*) transmits another sidelink transmission 1032 during slot 1008 that reserves the same resource 1036 in slot 1016 on sub-channel 1042. A third UE (e.g., UE 120*c*) receives the sidelink transmissions 1030 and 1032 and decodes control information in the sidelink transmissions, including the resource reservation in each sidelink transmission. The third UE determines that the reservation of resource 1036 by the first UE collides with the reservation of resource 1036 by the second UE. The third UE then transmits joint feedback 1034 including HARQ feedback and a collision indication to the second UE. The HARQ feedback in the joint feedback 1034 may be an ACK (e.g., if the third UE decoded a data channel in the sidelink transmission 1032) or a NACK (e.g., if the third UE failed in decoding a data channel in the sidelink transmission 1032). The collision indication in the joint feedback 1034 indicates that the third UE has detected a collision between the resource reservation in sidelink transmission 1032 and another resource reservation (e.g., the resource reservation in the sidelink transmission 1030). As discussed herein, upon receiving the joint feedback 1034 including the indication of the collision, the second UE may defer from transmitting in resource 1036 and/or may surrender the resource reservation, e.g., by transmitting another SCI (not shown) cancelling the reservation.

In some aspects of the present disclosure, a first set of HARQ feedback resources (e.g., the resources 1038) configured for UEs operating according to a first communication standard (e.g., Rel-16) may be in a different set of slots than a second set of HARQ feedback resources (e.g., the resources for the feedback 1034) configured for UEs operating according to a second communication standard (e.g., Rel-17).

In some aspects of the present disclosure, a first set of HARQ feedback resources (e.g., the resources 1038) configured for UEs operating according to a first communication standard (e.g., Rel-16) may be in a different set of resource blocks (RBs) than a second set of HARQ feedback resources (e.g., the resources for the feedback 1034) configured for UEs operating according to a second communication standard (e.g., Rel-17). The second set of feedback resources may be in RBs that are reserved according to the first communication standard.

According to certain aspects of the present disclosure, a UE (e.g., UE 120*a*, shown in FIGS. 1-2) may transmit joint feedback (e.g., in response to a sidelink transmission) of 2 bits that jointly indicate the HARQ feedback type and whether the UE detected a collision, wherein the UE includes the indication of whether a collision is detected only if the HARQ feedback is a NACK. For example, when a receiving UE successfully decodes a transmission, it may be assumed that the transmitting UE may release and/or give up the reserved resource (e.g., because the transmitting UE will not retransmit the transmission in response to the ACK). In an example, a codepoint of 11 (i.e., the value of the two bits) may indicate an ACK; a codepoint of 01 may indicate a NACK and no collision is detected (e.g., so the transmitting UE may use the reserved resource for retransmission), and a codepoint of 10 may indicate a NACK and a collision is detected (e.g., so the transmitting UE may give up transmission or retransmission in the reserved resource, even though the feedback was a NACK).

In certain aspects of the present disclosure, a UE (e.g., UE 120*a*, shown in FIGS. 1-2) may transmit joint feedback (e.g., in response to a sidelink transmission) that is NACK-only feedback with 1 bit indicating whether the UE detected a collision on reserved resources. In an example, if the UE successfully decoded the transmission and determined to convey an ACK, then the UE sends no feedback (i.e., no feedback to the data-transmitting UE indicates an ACK). In the example, if the UE fails in decoding the transmission, then the UE may send 1 bit of feedback, such as with a codepoint of 0 indicating that no collision is detected and such as a codepoint of 1 indicating that a collision is detected. In the example, when the joint feedback is detected by the transmitting UE, the transmitting UE determines that decoding of the data transmission is not successful, and meanwhile, the transmitting UE is able to determine whether there is a collision in the reserved resource(s).

According to certain aspects of the present disclosure, in a broadcast transmission system or groupcast transmission system, a number of feedback resources (e.g., time and/or frequency and/or code resources) may be determined (e.g., by a transmitting device and/or a receiving device) for each subchannel and/or data channel transmission, such that different feedback (e.g., different codepoints) may be transmitted in different feedback resources. For example, in a broadcast or groupcast system which uses M possible feedback codepoints (e.g., M=2, 3, or 4, as described herein), at least M feedback resources may be determined for a data channel transmission by a transmitting UE. In certain aspects, such as using such codepoints, for each sub-channel or data transmission, at least M feedback resources may be configured or preconfigured. In certain aspects, different receiving UEs may transmit the same feedback (e.g., a same sequence or cyclic shift in a same time and frequency resource). That is, in such aspects, the transmitting UE does not distinguish (e.g., and does not need to distinguish) between feedback from the different receiving UEs, because the transmitting UE uses the feedback types regardless of which receiving UE transmitted each feedback type.

For example, in an example broadcast system in which M=2 is assumed for illustration, two feedback resources, r1 (e.g., the resources for the feedback 1034) and r2 (e.g., the resources 1038), may be determined for a data channel transmission from a transmitting UE. The 2 resources may be in 2 different physical resource blocks (PRBs), or in a same PRB using different cyclic shifts. In the example broadcast system, assume N1 receiving UEs fail to decode the data transmission and also detect a collision in the reserved resources. In certain aspects, the N1 UEs all transmit the same feedback (e.g., a same time and frequency location with a same cyclic shift) with a same CS in r1. In certain aspects, assume another N2 receiving UEs fail to decode the data transmission and also detect no collision in the reserved resources. In certain aspects, the N2 UEs all transmit the same feedback (e.g., same time and frequency location with a same cyclic shift) in a same time and frequency resource, which is different from the resource the N1 UEs used for the feedback transmission (e.g., r2).

In certain aspects of the present disclosure, a feedback (e.g., joint feedback) transmission resource may be determined (e.g., by a transmitting UE or a receiving UE) based on both a feedback type (e.g., the codepoint of the feedback) and an identifier (ID, e.g., a member ID of a UE in a group) of a receiving UE and/or transmitting UE. In other words, a transmitting UE may distinguish feedbacks from different receiving UEs. For example, when there are M feedback types (codepoints), at least $M*N_g$ feedback resources may be determined for a data channel transmission, if $N_g$ (e.g., a number of UEs in a group) UEs are receiving the data channel transmission. According to certain aspects of the present disclosure, the $M*N_g$ feedback resources may be frequency resources (e.g., PRBs) and/or code resources (e.g., cyclic shifts). According to these aspects, a receiving UE may determine a feedback (e.g., joint feedback) resource location based on the receiving UE's ID (e.g., a member ID within the group) and the feedback type (e.g., codepoint).

Figure 11:
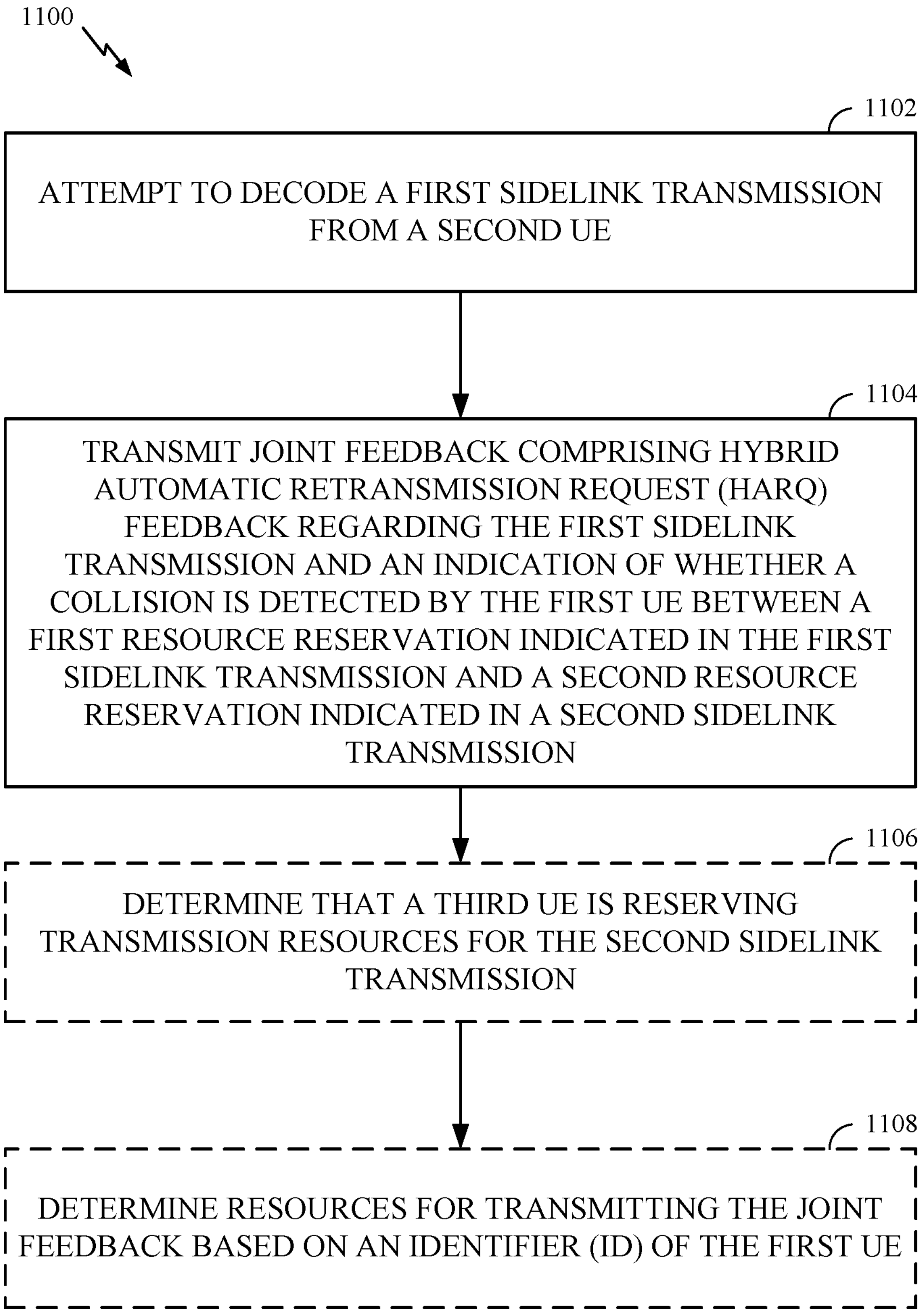
FIG. 11 is a flow diagram illustrating example operations for wireless communication by a first UE, in accordance with certain aspects of the present disclosure.

FIG. 11 is a flow diagram illustrating example operations 1100 for wireless communication, in accordance with certain aspects of the present disclosure. The operations 1100 may be performed, for example, by a first UE (e.g., the UE 120*a* in the wireless communication network 100). The operations 1100 may be implemented as software components that are executed and run on one or more processors (e.g., controller/processor 280 of FIG. 2). Further, the transmission and reception of signals by the first UE in operations 1100 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

The operations 1100 may begin, at block 1102, where the first UE may attempt to decode a first sidelink transmission from a second UE. For example, the first UE may receive the first sidelink transmission and attempt to decode the first sidelink transmission according to the specific modulation and coding scheme (MCS) associated with the first sidelink transmission, such as the modulation order and/or code rate of the first sidelink transmission. The first UE may also attempt to decode a second sidelink transmission from a third UE, for example, as described herein with respect to FIG. 10. For example, the first UE may receive the second sidelink transmission and attempt to decode the second sidelink transmission according to the specific MCS with the second sidelink transmission Operations 1100 may continue, at block 1104, where the first UE may transmit joint feedback comprising HARQ feedback regarding the first sidelink transmission and an indication of whether a collision is detected by the first UE between a first resource reservation indicated in the first sidelink transmission and a second resource reservation indicated in a second sidelink transmission. For example, the first UE may transmit the joint feedback to the second UE and/or a third UE from which the first UE received the second sidelink transmission.

Operations 1100 may optionally continue, at block 1106, where the first UE may determine that a third UE is reserving transmission resources for the second sidelink transmission.

Operations 1100 may optionally continue, at block 1108, where the first UE may determine resources for transmitting the joint feedback based on an identifier (ID) of the first UE and/or the second UE.

Figure 12:
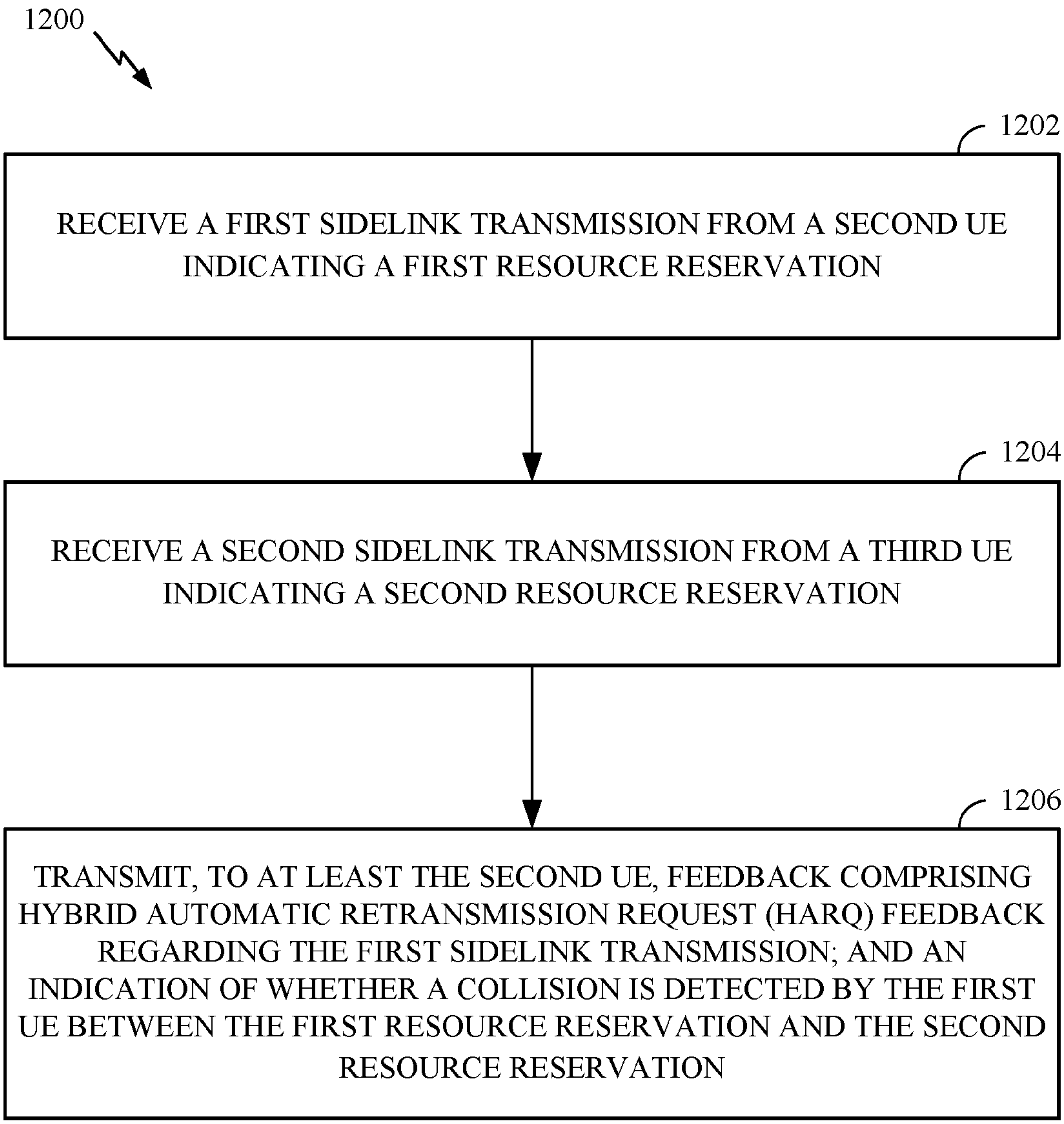
FIG. 12 is a flow diagram illustrating additional example operations for wireless communication by a first UE, in accordance with certain aspects of the present disclosure.

FIG. 12 is a flow diagram illustrating additional example operations 1200 for wireless communication, in accordance with certain aspects of the present disclosure. The operations 1200 may be performed, for example, by a first UE (e.g., the UE 120*a* in the wireless communication network 100). The operations 1200 may be implemented as software components that are executed and run on one or more processors (e.g., controller/processor 280 of FIG. 2). Further, the transmission and reception of signals by the first UE in operations 1200 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

The operations 1200 may begin, at block 1202, where the first UE (e.g., the UE 120*a* in FIG. 1) may receive a first sidelink transmission (e.g., the sidelink transmission 1030) from a second UE (e.g., the UE 120*b* in FIG. 1) indicating a first resource reservation (e.g., the resource 1036). For example, the first UE may receive an SCI transmission indicating the first resource reservation that the second UE will use to transmit to the first UE.

At block 1204, the first UE may receive a second sidelink transmission (e.g., the sidelink transmission 1032) from a third UE (e.g., the UE 120*c* in FIG. 1) indicating a second resource reservation (e.g., the resource 1036). For example, the first UE may receive an SCI transmission indicating the second resource reservation that the third UE will use to transmit another sidelink transmission.

At block 1206, the first UE may transmit, to at least the second UE, feedback (e.g., the joint feedback 1034) comprising HARQ feedback regarding the first sidelink transmission and an indication of whether a collision is detected by the first UE between the first resource reservation and the second resource reservation. The indication of whether the collision is detected may indicate either that the collision is detected or that the collision is not detected. As used herein, a collision that is not detected may refer to a UE (e.g., the first UE) detecting that the resource reservations from other UEs (e.g., the second and third UEs) are non-overlapping in the frequency domain and/or time domain. For example, the UE may detect that there is separation in the frequency domain and/or time domain between the resource reservations from the other UEs (e.g., the first resource reservation and the second resource reservation), and the UE may consider such separation(s) as there being no collision between the resource reservations from the other UEs.

HARQ feedback regarding (e.g., associated with or corresponding to) the first sidelink transmission may include HARQ feedback for the first sidelink transmission and/or HARQ feedback for other transmission(s) scheduled in the first resource reservation. For example, the first UE may not successfully decode the first sidelink transmission and/or other transmission(s) scheduled in the first resource reservation, and the first UE may provide the corresponding NACK in the joint feedback. In certain cases, the first UE may determine that there is a collision based on the resource reservations indicated in the sidelink transmissions. For example, the first UE may identify that the first resource reservation at least partially overlaps with the second resource reservation in the frequency domain, and if the first UE is not able to successfully decode a transmission associated with the first sidelink transmission (e.g., at least one of the transmissions in the first resource reservation), the first UE may transmit the joint feedback with a NACK and the indication that there is a collision to the second UE. In certain cases, the first UE may transmit the joint feedback to the second UE and the third UE. HARQ feedback regarding the first sidelink transmission may refer to HARQ feedback associated with or corresponding to the first sidelink transmission or other transmission(s) scheduled in the first resource reservation.

In certain aspects, the first UE may implicitly provide the indication of whether the collision is detected to the second UE and/or third UE. For example, the first UE may transmit the joint feedback via specific resources reserved for indicating that a collision is detected and/or not detected. That is, the first UE may be configured with resources associated with the state where a collision is detected and/or the state where the collision is not detected, and the first UE may use such resources to provide the indication to the second UE and/or third UE. The first UE may transmit a signal indicating the HARQ feedback in a first set of resources (e.g., the first set of HARQ feedback resources 930 and/or frequency domain, time domain, and/or spatial domain resources) when (e.g., in response to) the collision is not detected between the first resource reservation and the second resource reservation. As an example, the first set of resources may be implicitly indicative of the collision not being detected between the first resource reservation and the second resource reservation. For certain aspects, the first UE may transmit a signal indicating the HARQ feedback in a second set of resources (e.g., the second set of HARQ feedback resources 932 and/or frequency domain, time domain, and/or spatial domain resources separate from the first set of resources) when (e.g., in response to) the collision is detected. As an example, the second set of resources may be implicitly indicative of the collision being detected between the first resource reservation and the second resource reservation.

For certain aspects, the first UE may explicitly provide the indication of whether the collision is detected. For example, the feedback may consist of a bit indicating the HARQ feedback and another bit indicating whether the collision is detected between the first resource reservation and the second resource reservation. That is, the feedback may consist of two bits where one of the bits is for the HARQ feedback and the other bit is for the collision indication.

In certain cases (e.g., an ACK-NACK HARQ feedback application), the joint feedback may have three states: a first state where the joint feedback indicates an ACK; a second state where the joint feedback indicates a NACK and the collision is not detected; or a third state where the joint feedback indicates a NACK and the collision is detected. In the first state, the joint feedback may have a reserved field for the collision indication, where the value of the collision indication may be a dummy value. In certain cases, the collision may be assumed to be undetected in the first state given that the ACK indicates the first UE successfully decoded a sidelink transmission. In certain cases, the three states may be represented by three separate codepoint values, for example, as described herein. As an example, the joint feedback may comprise a value selected from a set of values (e.g., codepoint values). In certain aspects, the set of values may include a first value that indicates the HARQ feedback comprises an ACK; a second value that indicates the HARQ feedback comprises a NACK and the collision is not detected; and a third value that indicates the HARQ feedback comprises the NACK and the collision is detected. As used herein, a set may refer to a collection of one or more elements, such as a collection of values or resources.

For certain cases (e.g., a NACK-only HARQ feedback application), the joint feedback may have two states: a first state where the joint feedback indicates the NACK and the collision is not detected; or a second state where the joint feedback indicates the NACK and the collision is detected. In certain cases, the two states may be represented by two separate codepoint values, for example, as described herein. In certain aspects, the joint feedback may comprise a value selected from a set of values (e.g., codepoint values), and the set of values may include a first value that indicates the HARQ feedback comprises a NACK and the collision is not detected; and a second value that indicates the HARQ feedback comprises the NACK and the collision is detected.

In such cases for NACK-only feedback, the joint feedback may be a single bit providing the collision indication, under the assumption that if the first UE is transmitting HARQ feedback in a NACK-only setting, the HARQ feedback is a NACK.

In certain aspects, the first UE may transmit the joint feedback if the third UE has a first traffic priority higher than a second traffic priority of the second UE. For certain aspects, the first UE may transmit the joint feedback if the second UE has a second traffic priority higher than the first traffic priority of the third UE.

In certain cases, the first sidelink transmission and/or the second sidelink transmission may include SCI. For example, the first resource reservation and/or the second resource reservation may be indicated in SCI.

According to certain aspects, the first UE may identify whether there is collision based on one or more criteria, such as the resource reservations indicated in the received transmissions and/or the RSRP of the second sidelink transmission. For example, the first UE may identify that there is a collision based on the RSRP of the second sidelink transmission being greater than or equal to a threshold value. The indication may further indicate whether the collision is detected based on a RSRP associated with the second sidelink transmission.

In certain aspects, the first UE may transmit the joint feedback via resources based on a UE ID, such as the UE ID of the first UE, second UE, and/or third UE.

Figure 13:
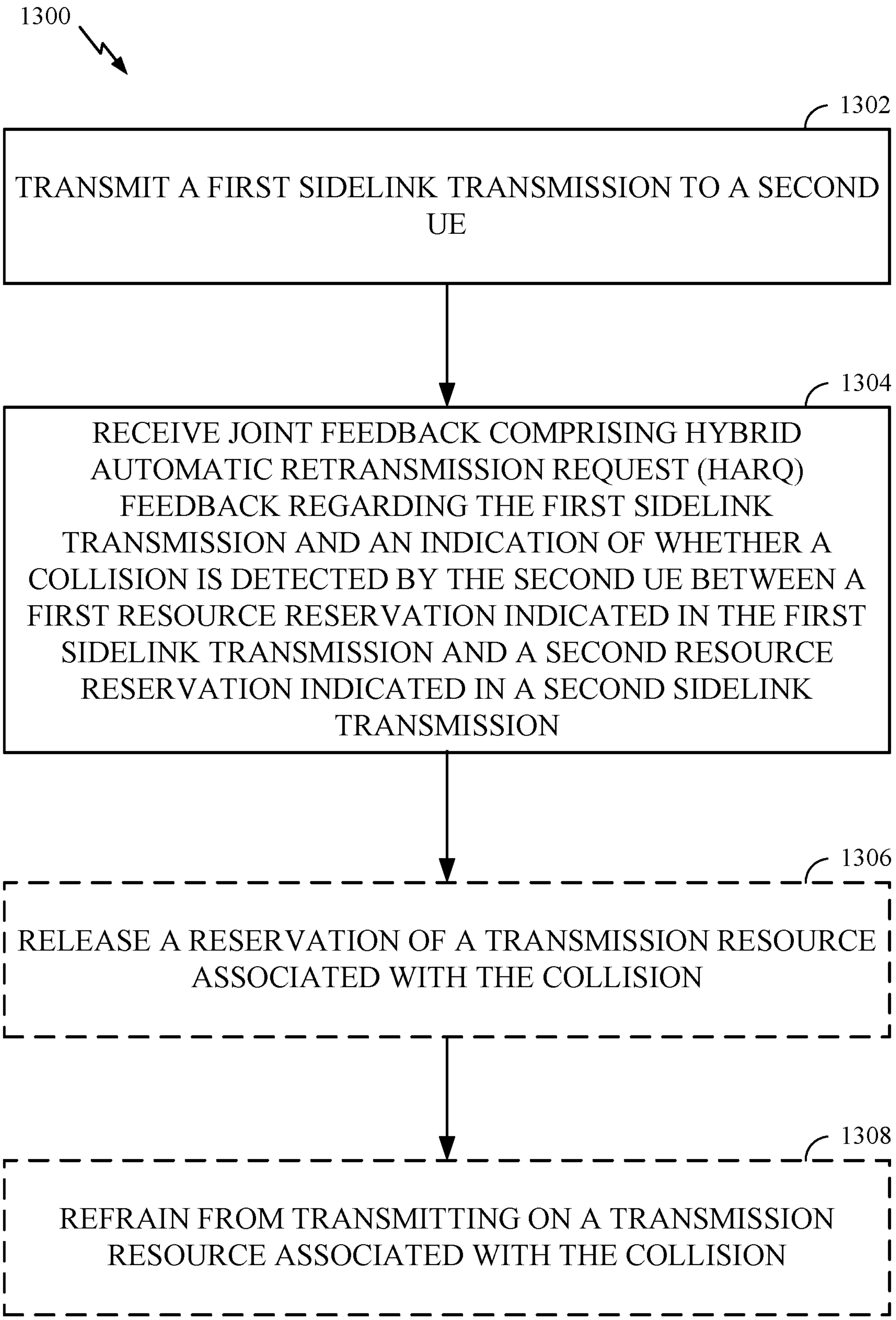
FIG. 13 is a flow diagram illustrating example operations for wireless communication by a second UE, in accordance with certain aspects of the present disclosure.

FIG. 13 is a flow diagram illustrating example operations 1300 for wireless communication, in accordance with certain aspects of the present disclosure. The operations 1300 may be performed, for example, by a second UE (e.g., the UE 120*b* in the wireless communication network 100). The operations 1300 may be complimentary to the operations 1100 performed by the first UE. The operations 1300 may be implemented as software components that are executed and run on one or more processors (e.g., controller/processor 280 of FIG. 2). Further, the transmission and reception of signals by the second UE in operations 1300 may be enabled, for example, by one or more antennas (e.g., antennas 252 of FIG. 2). In certain aspects, the transmission and/or reception of signals by the second UE may be implemented via a bus interface of one or more processors (e.g., controller/processor 280) obtaining and/or outputting signals.

The operations 1300 may begin, at block 1302, where the second UE may transmit a first sidelink transmission to a first UE (e.g., the UE 120*a*).

Operations 1300 may continue, at block 1304, where the second UE may receive joint feedback comprising HARQ feedback regarding the first sidelink transmission and an indication of whether a collision is detected by the first UE between a first resource reservation indicated in the first sidelink transmission and a second resource reservation indicated in a second sidelink transmission.

Operations 1300 may optionally continue, at block 1306, where the second UE may release a reservation of a transmission resource associated with the collision.

Operations 1300 may optionally continue, at block 1308, where the second UE may refrain from transmitting on a transmission resource associated with the collision.

Figure 14:
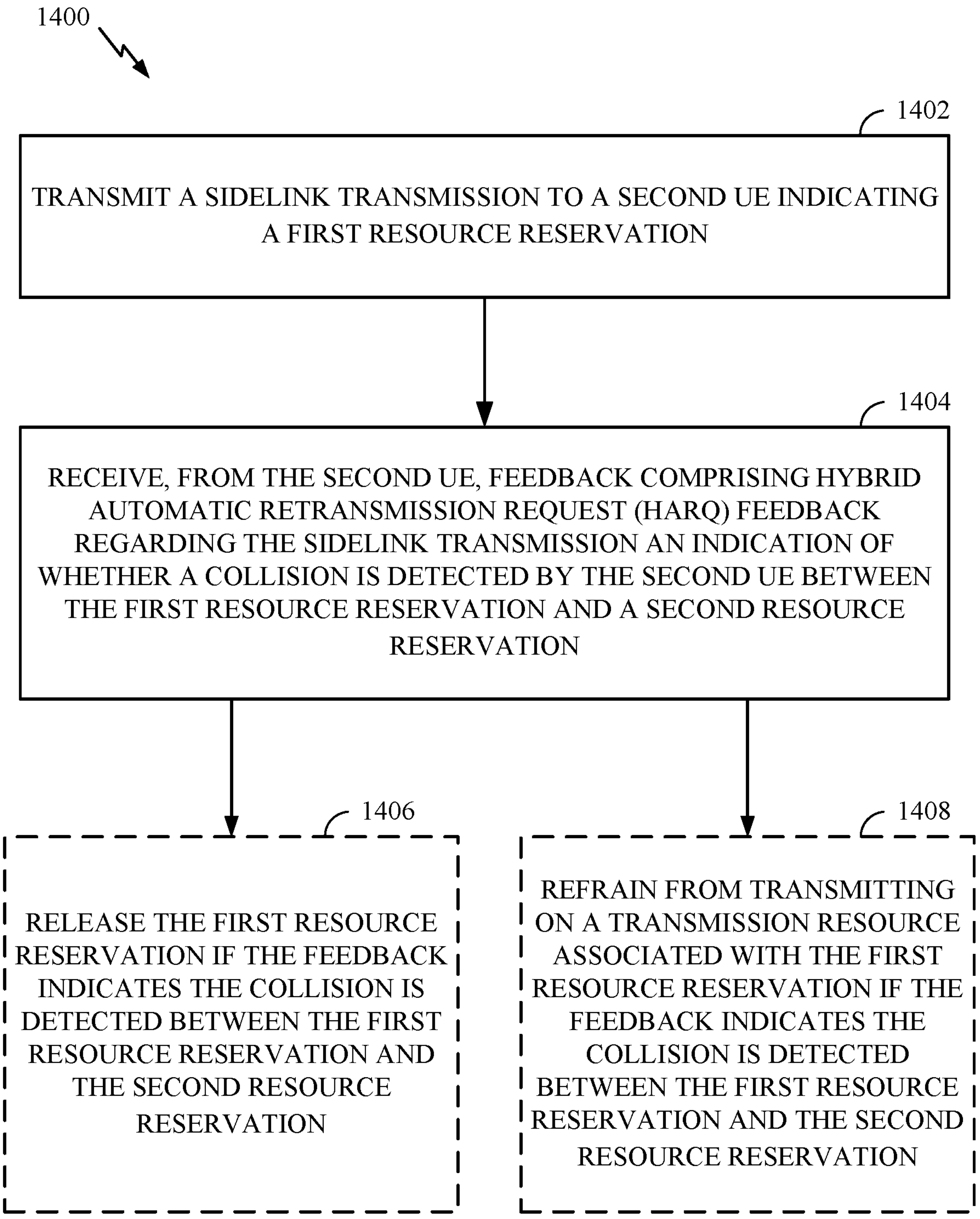
FIG. 14 is a flow diagram illustrating additional example operations for wireless communication by a second UE, in accordance with certain aspects of the present disclosure.

FIG. 14 is a flow diagram illustrating additional example operations 1400 for wireless communication, in accordance with certain aspects of the present disclosure. The operations 1400 may be performed, for example, by a second UE (e.g., the UE 120*b* in the wireless communication network 100). The operations 1400 may be complimentary to the operations 1200 performed by the first UE. The operations 1400 may be implemented as software components that are executed and run on one or more processors (e.g., controller/processor 280 of FIG. 2). Further, the transmission and reception of signals by the second UE in operations 1400 may be enabled, for example, by one or more antennas (e.g., antennas 252 of FIG. 2). In certain aspects, the transmission and/or reception of signals by the second UE may be implemented via a bus interface of one or more processors (e.g., controller/processor 280) obtaining and/or outputting signals.

The operations 1400 may begin, at block 1402, where the second UE (e.g., the UE 120*b*) may transmit a sidelink transmission (e.g., the sidelink transmission 1032) to a first UE (e.g., the UE 120*a*) indicating a first resource reservation. For example, the second UE may transmit SCI indicating the first resource reservation to the first UE.

At block 1404, the second UE may receive, from the first UE, feedback (e.g., the joint feedback 1034) comprising HARQ feedback regarding the sidelink transmission; and an indication of whether a collision is detected by the first UE between the first resource reservation and a second resource reservation, which may be transmitted by a third UE (e.g., the UE 120*c*) and received at the first UE. For example, the second UE may receive joint feedback that includes a NACK and the indication that the collision is not detected at the first UE. In such a case, the second UE may perform retransmissions without changing the resources in the first resource reservation. As an example, the second UE may receive joint feedback that includes a NACK and the indication that the collision is detected. In such a case, the second UE may take one or more actions in response to the detected collision between the first resource reservation and the second resource reservation.

Optionally, at block 1406, the second UE may release the first resource reservation if the feedback indicates the collision is detected. For example, the second UE may indicate to the first UE and/or other UEs that the second UE will not be using the resources in the first resource reservation.

Optionally, at block 1408, the second UE may refrain from transmitting on a transmission resource associated with the first resource reservation if the feedback indicates the collision is detected. To avoid the collision, the second UE may refrain from transmitting to the first UE during the transmission occasion(s) associated with the first resource reservation.

In aspects, the second UE may receive the joint feedback with an implicit or explicit indication of whether the collision is detected at the first UE, for example, as described herein with respect to the operations 1200. For example, the second UE may receive an implicit indication of the collision based on the resources used to receive the joint feedback. In certain cases, the second UE may receive an explicit indication of the collision via one of the two or three states of the joint feedback as described herein with respect to the operations 1200.

For certain aspects, the indication may further indicate whether the collision is detected based on the second resource reservation being from a third UE. The second UE may receive the joint feedback if the third UE has a higher priority than the second UE. In certain cases, the second UE may receive the joint feedback if the second UE has a higher priority than the third UE.

In certain aspects, the indication may further indicate whether the collision is detected based on a RSRP associated with a second sidelink transmission that indicated the second resource reservation. For example, the first UE may detect the collision based on the RSRP of the second sidelink transmission, and the indication received at the second UE may be based on this type of detection at the first UE.

According to certain aspects, the second UE may receive the joint feedback via a resource based on a UE ID, such as the ID of the first UE and/or the second UE.

It should be noted that though various blocks of operations 1100, 1200, 1300, and 1400 are specifically called out as optional blocks, in certain aspects, any blocks of operations 1100, 1200, 1300, and 1400 may be optional. Further, any suitable combination of blocks of each of operations 1100, 1200, 1300, and 1400 is within the scope of the disclosure.

Figure 15:
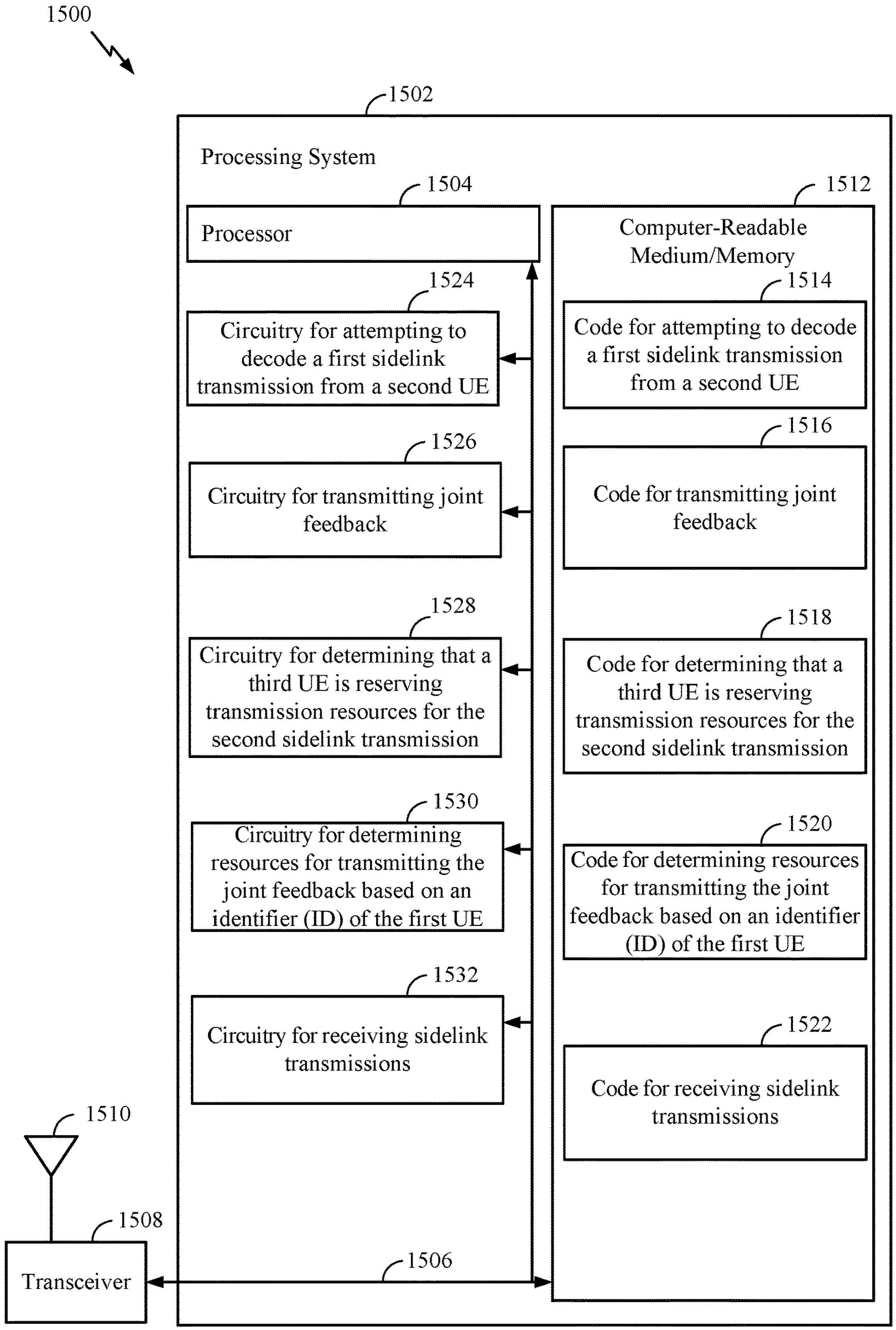
FIG. 15 illustrates a communications device that may include various components configured to perform the operations illustrated in FIG. 10, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIGS. 11 and 12. The communications device 1500 may be an example of means for performing various aspects of transmitting and receiving joint feedback, for a sidelink communication, that includes HARQ feedback and a collision indication, as described herein. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The communications device 1500, or its sub-components, may be implemented in code (e.g., as communications management software or firmware) executed by a processor, or any combination thereof. If implemented in code executed by a processor, the functions of the communications device 1500, or its sub-components may be executed by a general-purpose processor, a digital signal processor (DSP), an application-specific integrated circuit (ASIC), a field programmable gate array (FPGA) or other programmable logic device. The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIGS. 11 and 12, or other operations for performing the various techniques discussed herein for transmitting and receiving joint feedback, for a sidelink communication, that includes HARQ feedback and a collision indication. In certain aspects, computer-readable medium/memory 1512 stores code 1514 for attempting to decode a first sidelink transmission from a second UE; code 1516 for transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission, code 1518 for determining that a third UE is reserving transmission resources for the second sidelink transmission, code 1520 for determining resources for transmitting the joint feedback based on an identifier (ID) of the first UE, and/or code 1522 for receiving sidelink transmissions (such as the first and second sidelink transmissions in the operations 1200).

In another implementation, the communications device 1500, or its sub-components, may be implemented in hardware (e.g., in joint feedback management circuitry). The circuitry may comprise a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. In certain aspects, the processor 1504 has circuitry configured to implement the code stored in the computer-readable medium/memory 1512. The processing system 1502 includes circuitry (e.g., an example of means for) 1524 for attempting to decode a first sidelink transmission from a second UE; circuitry (e.g., an example of means for) 1526 for transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission, circuitry (e.g., an example of means for) 1528 for determining that a third UE is reserving transmission resources for the second sidelink transmission, circuitry (e.g., an example of means for) 1530 for determining resources for transmitting the joint feedback based on an identifier (ID) of the first UE, and/or circuitry (e.g., an example of means for) 1532 for receiving sidelink transmissions.

Figure 16:
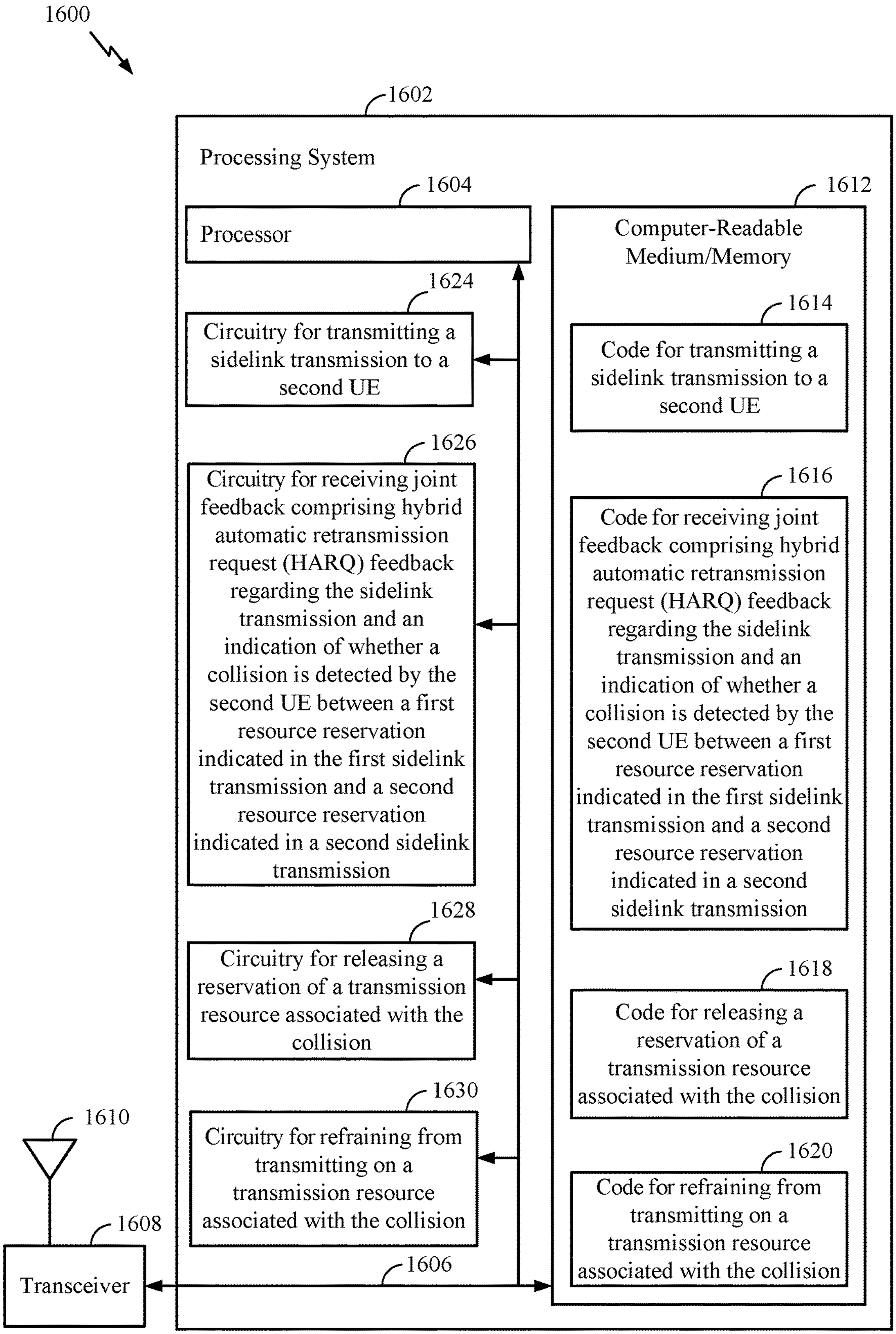
FIG. 16 illustrates a communications device that may include various components configured to perform the operations illustrated in FIG. 11, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIGS. 13 and 14. The communications device 1600 may be an example of means for performing various aspects of transmitting and receiving joint feedback, for a sidelink communication, that includes HARQ feedback and a collision indication, as described herein. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The communications device 1600, or its sub-components, may be implemented in code (e.g., as communications management software or firmware) executed by a processor, or any combination thereof. If implemented in code executed by a processor, the functions of the communications device 1600, or its sub-components may be executed by a general-purpose processor, a digital signal processor (DSP), an application-specific integrated circuit (ASIC), a field programmable gate array (FPGA) or other programmable logic device. The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIGS. 13 and 14, or other operations for performing the various techniques discussed herein for transmitting and receiving joint feedback, for a sidelink communication, that includes HARQ feedback and a collision indication. In certain aspects, computer-readable medium/memory 1612 stores code 1614 for transmitting a first sidelink transmission to a second UE; code 1616 for receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission, code 1618 for releasing a reservation of a transmission resource associated with the collision, and/or code 1620 for refraining from transmitting on a transmission resource associated with the collision.

In another implementation, the communications device 1600, or its sub-components, may be implemented in hardware (e.g., in joint feedback management circuitry). The circuitry may comprise a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. In certain aspects, the processing system 1602 has circuitry configured to implement the code stored in the computer-readable medium/memory 1612. The processor 1604 includes circuitry (e.g., an example of means for) 1624 for transmitting a first sidelink transmission to a second UE; circuitry (e.g., an example of means for) 1626 for receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission, circuitry (e.g., an example of means for) 1628 for releasing a reservation of a transmission resource associated with the collision, and/or circuitry (e.g., an example of means for) 1630 for refraining from transmitting on a transmission resource associated with the collision.

Figure 17:
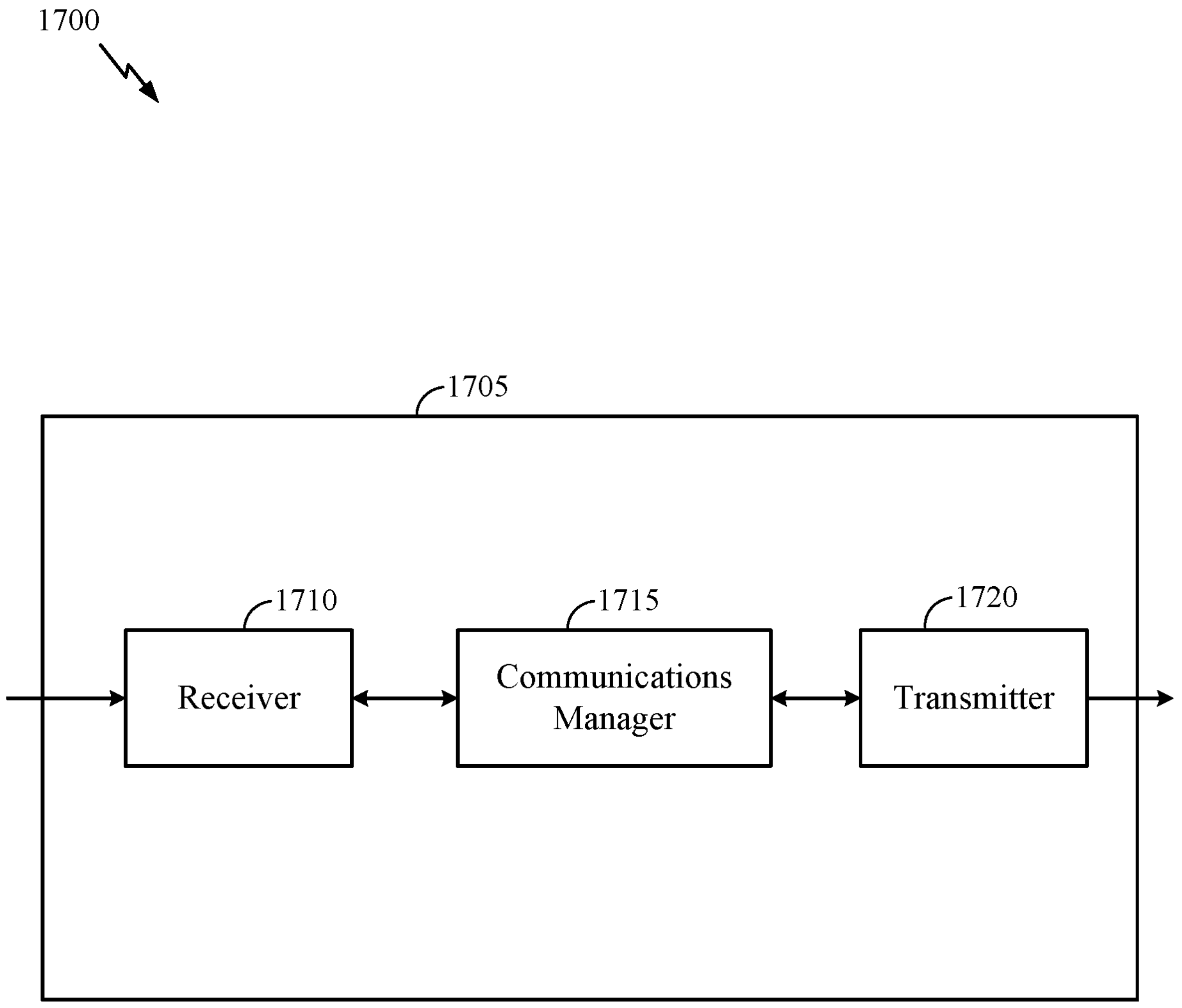
FIG. 17 shows a block diagram of a device that supports transmitting and receiving joint feedback, for a sidelink communication, that includes HARQ feedback and a collision indication, in accordance with one or more aspects of the present disclosure.

FIG. 17 shows a block diagram 1700 of a device 1705 that supports transmitting and receiving joint feedback, for a sidelink communication, that includes HARQ feedback and a collision indication, in accordance with one or more aspects of the present disclosure. The device 1705 may be an example of aspects of a UE 130, as described herein. The device 1705 may include a receiver 1710, a communications manager 1715, and a transmitter 1720. The device 1705 may also include a processor. Each of these components may be in communication with one another (e.g., via one or more buses).

The receiver 1710 may provide a means for receiving information such as packets, user data, or control information associated with various information channels (e.g., control channels, data channels, and information related to joint feedback, for a sidelink communication, that includes HARQ feedback and a collision indication, etc.). Information may be passed on to other components of the device 1705. The receiver 1710 may be an example of aspects of the transceivers 1508 and 1608, described with reference to FIGS. 15 and 16. The receiver 1710 may utilize a single antenna or a set of antennas.

The communications manager 1715 may support wireless communication in accordance with examples as disclosed herein. The communications manager 1715 may provide means for attempting to decode a first sidelink transmission from a second UE and/or receiving sidelink transmissions. The communications manager 1715 may provide means for transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission. The communications manager 1715 may provide means for transmitting a first sidelink transmission to a second UE. The communications manager 1715 may provide means for receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission. The communications manager 1715 may be an example of aspects of the communications devices 1500 and 1600 described herein.

The communications manager 1715 may be an example of means for performing various aspects of transmitting and receiving joint feedback, for a sidelink communication, that includes HARQ feedback and a collision indication, as described herein. The communications manager 1715, or its sub-components, may be implemented in hardware (e.g., in communications management circuitry), code (e.g., as communications management software or firmware) executed by a processor, or any combination thereof. If implemented in code executed by a processor, the functions of the communications manager 1715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. In some examples, the communication manager 1715 may be configured to perform various operations (e.g., receiving, determining, transmitting) using or otherwise in cooperation with the receiver 1710, the transmitter 1720, or both.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may provide means for transmitting signals generated by other components of the device 1705. In some examples, the transmitter 1720 may be collocated with a receiver 1710 in a transceiver module. For example, the transmitter 1720 may be an example of aspects of the transceivers 1508 and 1608 described with reference to FIGS. 15 and 16. The transmitter 1720 may utilize a single antenna or a set of antennas.

EXAMPLE ASPECTS

In addition to the various aspects described above, specific combinations of aspects are within the scope of the disclosure, some of which are detailed below:

Aspect 1: A method of wireless communication by a first user equipment (UE), comprising: attempting to decode a first sidelink transmission from a second UE; and transmitting joint feedback comprising hybrid automatic retransmission request (HARQ) feedback regarding the first sidelink transmission and an indication of whether a collision is detected by the first UE between a first resource reservation indicated in the first sidelink transmission and a second resource reservation indicated in a second sidelink transmission.

Aspect 2: The method of Aspect 1, wherein the indication indicates the collision is detected between the first resource reservation and the second resource reservation, based on a determination that the second resource reservation is from a third UE.

Aspect 3: The method of one of Aspects 1-2, wherein the third UE has a traffic priority higher than a traffic priority of the second UE.

Aspect 4: The method of one of Aspects 1-2, wherein the determination is based on sidelink control information (SCI) transmitted by the third UE.

Aspect 5: The method of Aspect 4, wherein the determination is further based on a reference signal reserved power (RSRP) associated with the third UE.

Aspect 6: The method of one of Aspects 1-5, wherein the joint feedback consists of a bit indicating the HARQ feedback and another bit indicating whether the collision is detected between the first resource reservation and the second resource reservation.

Aspect 7: The method of one of Aspects 1-6, wherein the joint feedback comprises a value selected from a set of values, wherein the set comprises: a first value that indicates the HARQ feedback comprises an acknowledgment (ACK); a second value that indicates the HARQ feedback comprises a negative acknowledgment (NACK) and the collision is not detected between the first resource reservation and the second resource reservation; and a third value that indicates the HARQ feedback comprises the NACK and the collision is detected between the first resource reservation and the second resource reservation.

Aspect 8: The method of one of Aspects 1-6, wherein the joint feedback comprises a value selected from a set of values, wherein the set comprises: a first value that indicates the HARQ feedback comprises a negative acknowledgment (NACK) and the collision is not detected between the first resource reservation and the second resource reservation; and a second value that indicates the HARQ feedback comprises the NACK and the collision is detected between the first resource reservation and the second resource reservation.

Aspect 9: The method of one of Aspects 1-8, wherein transmitting the joint feedback comprises: transmitting a signal indicating the HARQ feedback in a first set of resources when the collision is not detected between the first resource reservation and the second resource reservation; and transmitting another signal indicating the HARQ feedback in a second set of resources when the collision is detected between the first resource reservation and the second resource reservation.

Aspect 10: The method of one of Aspects 1-9, wherein transmitting the joint feedback comprises transmitting the joint feedback via resources determined based on an identifier of the first UE.

Aspect 11: A method of wireless communication by a first user equipment (UE), comprising: transmitting a first sidelink transmission to a second UE; and receiving joint feedback comprising hybrid automatic retransmission request (HARQ) feedback regarding the first sidelink transmission and an indication of whether a collision is detected by the second UE between a first resource reservation indicated in the first sidelink transmission and a second resource reservation indicated in a second sidelink transmission.

Aspect 12: The method of Aspect 11, wherein the indication indicates the collision is detected between the first resource reservation and the second resource reservation, based on a determination that the second resource reservation is from a third UE.

Aspect 13: The method of one of Aspects 11-12, wherein the third UE has a traffic priority higher than a traffic priority of the first UE.

Aspect 14: The method of one of Aspects 11-12, wherein the determination is based on sidelink control information (SCI) transmitted by the third UE.

Aspect 15: The method of Aspect 14, wherein the determination is further based on a reference signal reserved power (RSRP) associated with the third UE.

Aspect 16: The method of one of Aspects 11-15, wherein the joint feedback consists of a bit indicating the HARQ feedback and another bit indicating whether the collision is detected between the first resource reservation and the second resource reservation.

Aspect 17: The method of one of Aspects 11-16, wherein the joint feedback comprises a value selected from a set of values, wherein the set comprises: a first value that indicates the HARQ feedback comprises an acknowledgment (ACK); a second value that indicates the HARQ feedback comprises a negative acknowledgment (NACK) and the collision is not detected between the first resource reservation and the second resource reservation; and a third value that indicates the HARQ feedback comprises the NACK and the collision is detected between the first resource reservation and the second resource reservation.

Aspect 18: The method of one of Aspects 11-16, wherein the joint feedback comprises a value selected from a set of values, wherein the set comprises: a first value that indicates the HARQ feedback comprises a negative acknowledgment (NACK) and the collision is not detected between the first sidelink transmission and the second sidelink transmission; and a second value that indicates the HARQ feedback comprises the NACK and the collision is detected between the first resource reservation and the second resource reservation.

Aspect 19: The method of one of Aspects 11-18, wherein receiving the joint feedback comprises: receiving a signal indicating the HARQ feedback in a first set of resources when the collision is not detected between the first resource reservation and the second resource reservation; and receiving another signal indicating the HARQ feedback in a second set of resources when the collision is detected between the first resource reservation and the second resource reservation.

Aspect 20: The method of one of Aspects 11-19, wherein receiving the joint feedback comprises receiving the joint feedback via resources determined based on an identifier of the second UE.

Aspect 21: The method of one of Aspects 11-20, wherein the joint feedback indicates the collision is detected between the first resource reservation and the second resource reservation, and the method further comprises: releasing the first resource reservation.

Aspect 22: The method of one of Aspects 11-21, wherein the joint feedback indicates the collision is detected between the first resource reservation and the second resource reservation, and the method further comprises: refraining from transmitting on a transmission resource associated with the first resource reservation.

Aspect 23: An apparatus for wireless communications, comprising means for performing one or more of the methods of Aspects 1-22 and/or Aspects 47-55.

Aspect 24: An apparatus for wireless communications, comprising: a memory; and a processor coupled to the memory, the memory and the processor configured to perform the method of one or more of Aspects 1-22 and/or Aspects 47-55.

Aspect 25: A computer-readable medium, the medium including instructions that, when executed by a processing system, cause the processing system to perform the method of one or more of Aspects 1-22 and/or Aspects 47-55.

Aspect 26: An apparatus for wireless communications, comprising: a memory; and a processor coupled to the memory, the processor and the memory being configured to: receive a first sidelink transmission from a second UE indicating a first resource reservation, receive a second sidelink transmission from a third UE indicating a second resource reservation, and transmit, to at least the second UE, feedback comprising: hybrid automatic retransmission request (HARQ) feedback regarding the first sidelink transmission; and an indication of whether a collision is detected by the first UE between the first resource reservation and the second resource reservation.

Aspect 27: The apparatus of Aspect 26, wherein the processor and the memory are configured to: transmit a signal indicating the HARQ feedback in a first set of resources indicative of the collision not being detected between the first resource reservation and the second resource reservation; and transmit another signal indicating the HARQ feedback in a second set of resources indicative of the collision being detected between the first resource reservation and the second resource reservation.

Aspect 28: The apparatus according to any one of Aspects 26 or 27, wherein the third UE has a first traffic priority higher than a second traffic priority of the second UE.

Aspect 29: The apparatus according to any one of Aspects 26-28, wherein at least one of the first sidelink transmission or the second sidelink transmission comprises sidelink control information (SCI).

Aspect 30: The apparatus according to any one of Aspects 26-29, wherein the indication further indicates whether the collision is detected based on a reference signal reserved power (RSRP) associated with the second sidelink transmission.

Aspect 31: The apparatus according to any one of Aspects 26-30, wherein the feedback consists of a bit indicating the HARQ feedback and another bit indicating whether the collision is detected between the first resource reservation and the second resource reservation.

Aspect 32: The apparatus according to any one of Aspects 26-30, wherein the feedback comprises a value selected from a set of values, wherein the set of values comprises: a first value that indicates the HARQ feedback comprises an acknowledgment (ACK); a second value that indicates the HARQ feedback comprises a negative acknowledgment (NACK) and the collision is not detected between the first resource reservation and the second resource reservation; and a third value that indicates the HARQ feedback comprises the NACK and the collision is detected between the first resource reservation and the second resource reservation.

Aspect 33: The apparatus according to any one of Aspects 26-30, wherein the feedback comprises a value selected from a set of values, wherein the set of values comprises: a first value that indicates the HARQ feedback comprises a negative acknowledgment (NACK) and the collision is not detected between the first resource reservation and the second resource reservation; and a second value that indicates the HARQ feedback comprises the NACK and the collision is detected between the first resource reservation and the second resource reservation.

Aspect 34: The apparatus according to any one of Aspects 26-33, wherein the processor and the memory are further configured to transmit the feedback via resources determined based on an identifier of the first UE.

Aspect 35: The apparatus according to any one of Aspects 26-34, wherein the processor and the memory are further configured to transmit the feedback to the second UE and the third UE.

Aspect 36: An apparatus for wireless communications, comprising: a memory; and a processor coupled to the memory, the processor and the memory being configured to: transmit a sidelink transmission to a first UE indicating a first resource reservation, and receive feedback comprising: hybrid automatic retransmission request (HARQ) feedback regarding the sidelink transmission; and an indication of whether a collision is detected by the first UE between the first resource reservation and a second resource reservation.

Aspect 37: The apparatus of Aspect 36, wherein the processor and the memory are further configured to: receive a signal indicating the HARQ feedback in a first set of resources indicative of the collision not being detected between the first resource reservation and the second resource reservation; and receive another signal indicating the HARQ feedback in a second set of resources indicative of the collision being detected between the first resource reservation and the second resource reservation.

Aspect 38: The apparatus according to any one of Aspects 36 or 37, wherein the indication further indicates whether the collision is detected based on the second resource reservation being from a second UE.

Aspect 39: The apparatus according to any one of Aspects 36-38, wherein the second UE has a first traffic priority higher than a second traffic priority of the first UE.

Aspect 40: The apparatus according to any one of Aspects 36-39, wherein the sidelink transmission comprises sidelink control information (SCI).

Aspect 41: The apparatus according to any one of Aspects 36-40, wherein the indication further indicates whether the collision is detected based on a reference signal reserved power (RSRP) associated with a second sidelink transmission that indicated the second resource reservation.

Aspect 42: The apparatus according to any one of Aspects 36-41, wherein the feedback consists of a bit indicating the HARQ feedback and another bit indicating whether the collision is detected between the first resource reservation and the second resource reservation.

Aspect 43: The apparatus according to any one of Aspects 36-41, wherein the feedback comprises a value selected from a set of values, wherein the set of values comprises: a first value that indicates the HARQ feedback comprises a negative acknowledgment (NACK) and the collision is not detected between the first resource reservation and the second resource reservation; and a second value that indicates the HARQ feedback comprises a NACK and the collision is detected between the first resource reservation and the second resource reservation.

Aspect 44: The apparatus according to any one of Aspects 36-43, wherein the processor and the memory are further configured to receive the feedback via resources determined based on an identifier of the first UE.

Aspect 45: The apparatus according to any one of Aspects 36-44, wherein the processor and the memory are further configured to release the first resource reservation if the feedback indicates the collision is detected between the first resource reservation and the second resource reservation.

Aspect 46: The apparatus according to any one of Aspects 36-45, wherein the processor and the memory are further configured to refrain from transmitting on a transmission resource associated with the first resource reservation if the feedback indicates the collision is detected between the first resource reservation and the second resource reservation.

Aspect 47: A method for wireless communications by a first user equipment (UE), comprising: receiving a first sidelink transmission from a second UE indicating a first resource reservation; receiving a second sidelink transmission from a third UE indicating a second resource reservation; and transmitting, to at least the second UE, feedback comprising: hybrid automatic retransmission request (HARQ) feedback regarding the first sidelink transmission; and an indication of whether a collision is detected by the first UE between the first resource reservation and the second resource reservation.

Aspect 48: The method of Aspect 47, wherein transmitting the feedback comprises: transmitting a signal indicating the HARQ feedback in a first set of resources indicative of the collision not being detected between the first resource reservation and the second resource reservation; and transmitting another signal indicating the HARQ feedback in a second set of resources indicative of the collision being detected between the first resource reservation and the second resource reservation.

Aspect 49: The method according to any one of Aspects 47 or 48, wherein the feedback consists of a bit indicating the HARQ feedback and another bit indicating whether the collision is detected between the first resource reservation and the second resource reservation.

Aspect 50: The method according to any one of Aspects 47 or 48, wherein the feedback comprises a value selected from a set of values, wherein the set of values comprises: a first value that indicates the HARQ feedback comprises a negative acknowledgment (NACK) and the collision is not detected between the first resource reservation and the second resource reservation; and a second value that indicates the HARQ feedback comprises a NACK and the collision is detected between the first resource reservation and the second resource reservation.

Aspect 51: A method for wireless communications by a first user equipment (UE), comprising: transmitting a sidelink transmission to a second UE indicating a first resource reservation; and receiving, from the second UE, feedback comprising: hybrid automatic retransmission request (HARQ) feedback regarding the sidelink transmission; and an indication of whether a collision is detected by the second UE between the first resource reservation and a second resource reservation.

Aspect 52: The method of Aspect 51, wherein receiving the feedback comprises: receiving a signal indicating the HARQ feedback in a first set of resources indicative of the collision not being detected between the first resource reservation and the second resource reservation; and receiving another signal indicating the HARQ feedback in a second set of resources indicative of the collision being detected between the first resource reservation and the second resource reservation.

Aspect 53: The method according to any one of Aspects 51 or 52, wherein the feedback comprises a value selected from a set of values, wherein the set of values comprises: a first value that indicates the HARQ feedback comprises a negative acknowledgment (NACK) and the collision is not detected between the first resource reservation and the second resource reservation; and a second value that indicates the HARQ feedback comprises a NACK and the collision is detected between the first resource reservation and the second resource reservation.

Aspect 54: The method according to any one of Aspects 51-53, further comprising releasing the first resource reservation if the feedback indicates the collision is detected between the first resource reservation and the second resource reservation.

Aspect 55: The method according to any one of Aspects 51-54, further comprising refraining from transmitting on a transmission resource associated with the first resource reservation if the feedback indicates the collision is detected between the first resource reservation and the second resource reservation.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11, FIG. 12, FIG. 13, and/or FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications at a first user equipment (UE), comprising:

one or more memories; and one or more processors coupled with the one or more memories, and configured to cause the first UE to:

receive a first sidelink transmission from a second UE that indicates a first resource reservation;

receive a second sidelink transmission from a third UE that indicates a second resource reservation; and transmit, to at least the second UE, feedback comprising:

hybrid automatic retransmission request (HARQ) feedback regarding the first sidelink transmission, wherein the feedback comprises a value selected from a set of values that includes:

a first value that indicates the HARQ feedback comprises a negative acknowledgment (NACK) and a collision is undetected between the first resource reservation and a second resource reservation; and a second value that indicates the HARQ feedback comprises the NACK and the collision is detected between the first resource reservation and the second resource reservation.

2. The apparatus of claim 1, wherein the one or more processors are further configured to cause the first UE to:

transmit, in a first set of resources, a first signal that indicates the HARQ feedback, wherein transmission of the first signal in the first set of resources indicates that the collision is undetected between the first resource reservation and the second resource reservation; and transmit, in a second set of resources, a second signal that indicates the HARQ feedback, wherein transmission of the second signal in the second set of resources indicates that the collision is detected between the first resource reservation and the second resource reservation.

3. The apparatus of claim 1, wherein the third UE has a first traffic priority that is higher than a second traffic priority of the second UE.

4. The apparatus of claim 1, wherein at least one of the first sidelink transmission or the second sidelink transmission comprises sidelink control information (SCI).

5. The apparatus of claim 1, wherein the feedback further indicates whether the collision is detected based on a reference signal reserved power (RSRP) associated with the second sidelink transmission.

6. The apparatus of claim 1, wherein the feedback consists of a bit that indicates the HARQ feedback and another bit that indicates whether the collision is detected between the first resource reservation and the second resource reservation.

7. The apparatus of claim 1, wherein the set of values further comprises:

a third value that indicates the HARQ feedback comprises an acknowledgment (ACK).

8. The apparatus of claim 1, wherein the one or more processors are further configured to cause the first UE to transmit the feedback via one or more resources determined based on an identifier of the first UE.

9. The apparatus of claim 1, wherein the one or more processors are further configured to cause the first UE to transmit the feedback to the second UE and the third UE.

10. An apparatus for wireless communications at second user equipment (UE), comprising:

one or more memories; and one or more processors coupled with the one or more memories, and configured to cause the second UE to:

transmit a sidelink transmission to a first UE that indicates a first resource reservation; and receive feedback comprising:

hybrid automatic retransmission request (HARQ) feedback regarding the sidelink transmission, wherein the feedback comprises a value selected from a set of values that includes:

a first value that indicates the HARQ feedback comprises a negative acknowledgment (NACK) and a collision is undetected between the first resource reservation and a second resource reservation; and a second value that indicates the HARQ feedback comprises the NACK and the collision is detected between the first resource reservation and the second resource reservation.

11. The apparatus of claim 10, wherein the one or more processors are further configured to cause the second UE to:

receive, in a first set of resources, a first signal that indicates the HARQ feedback, wherein reception of the first signal in the first set of resources indicates that the collision is undetected between the first resource reservation and the second resource reservation; and receive, in a second set of resources, a second signal that indicates the HARQ feedback, wherein reception of the second signal in the second set of resources indicates that the collision is detected between the first resource reservation and the second resource reservation.

12. The apparatus of claim 10, wherein the feedback further indicates whether the collision is detected based on the second resource reservation from a third UE.

13. The apparatus of claim 12, wherein the third UE has a first traffic priority higher than a second traffic priority of the first UE.

14. The apparatus of claim 10, wherein the sidelink transmission comprises sidelink control information (SCI).

15. The apparatus of claim 10, wherein the feedback further indicates whether the collision is detected based on a reference signal reserved power (RSRP) associated with a second sidelink transmission that indicated the second resource reservation.

16. The apparatus of claim 10, wherein the feedback consists of a bit that indicates the HARQ feedback and another bit that indicates whether the collision is detected between the first resource reservation and the second resource reservation.

17. The apparatus of claim 10, wherein the one or more processors are further configured to cause the second UE to receive the feedback via one or more resources determined based on an identifier of the first UE.

18. The apparatus of claim 10, wherein the one or more processors are further configured to cause the second UE to release the first resource reservation if the feedback indicates the collision is detected between the first resource reservation and the second resource reservation.

19. The apparatus of claim 10, wherein the one or more processors are further configured to cause the second UE to refrain from transmitting on a transmission resource associated with the first resource reservation if the feedback indicates the collision is detected between the first resource reservation and the second resource reservation.

20. A method for wireless communications at a first user equipment (UE), comprising:

receiving a first sidelink transmission from a second UE indicating a first resource reservation;

receiving a second sidelink transmission from a third UE indicating a second resource reservation; and transmitting, to at least the second UE, feedback comprising:

hybrid automatic retransmission request (HARQ) feedback regarding the first sidelink transmission, wherein the feedback comprises a value selected from a set of values that includes:

a first value that indicates the HARQ feedback comprises a negative acknowledgment (NACK)

and a collision is undetected between the first resource reservation and the second resource reservation; and a second value that indicates the HARQ feedback comprises the NACK and the collision is detected between the first resource reservation and the second resource reservation.

21. The method of claim 20, wherein transmitting the feedback comprises:

transmitting, in a first set of resources, a first signal that indicates the HARQ feedback, wherein transmitting the first signal in the first set of resources indicates that the collision is undetected between the first resource reservation and the second resource reservation; and transmitting, in a second set of resources, a second signal that indicates the HARQ feedback, wherein transmitting the second signal in the second set of resources indicates that the collision is detected between the first resource reservation and the second resource reservation.

22. The method of claim 20, wherein the feedback consists of a bit indicating the HARQ feedback and another bit indicating whether the collision is detected between the first resource reservation and the second resource reservation.

23. The method of claim 20, wherein the third UE has a first traffic priority that is higher than a second traffic priority of the second UE.

24. A method for wireless communications at a second user equipment (UE), comprising:

transmitting a sidelink transmission to a first UE indicating a first resource reservation; and receiving, from the first UE, feedback comprising:

hybrid automatic retransmission request (HARQ) feedback regarding the sidelink transmission, wherein the feedback comprises a value selected from a set of values that includes:

a first value that indicates the HARQ feedback comprises a negative acknowledgment (NACK) and a collision is undetected between the first resource reservation and a second resource reservation; and a second value that indicates the HARQ feedback comprises the NACK and the collision is detected between the first resource reservation and the second resource reservation.

25. The method of claim 24, wherein receiving the feedback comprises:

receiving, in a first set of resources, a first signal that indicates the HARQ feedback, wherein receiving the first signal in the first set of resources indicates that the collision is undetected between the first resource reservation and the second resource reservation; and receiving, in a second set of resources, a second signal that indicates the HARQ feedback, wherein receiving the second signal in the second set of resources indicates that the collision is detected between the first resource reservation and the second resource reservation.

26. The method of claim 24, further comprising releasing the first resource reservation if the feedback indicates the collision is detected between the first resource reservation and the second resource reservation.

27. The method of claim 24, further comprising refraining from transmitting on a transmission resource associated with the first resource reservation if the feedback indicates the collision is detected between the first resource reservation and the second resource reservation.

28. The method of claim 24, wherein:

the feedback further indicates whether the collision is detected based on the second resource reservation from a third UE; and the third UE has a first traffic priority higher than a second traffic priority of the first UE.

29. A non-transitory computer-readable medium for wireless communications, comprising:

instructions that, when executed by one or more processors of a first user equipment (UE), cause the first UE to:

receive a first sidelink transmission from a second UE that indicates a first resource reservation;

receive a second sidelink transmission from a third UE that indicates a second resource reservation; and transmit, to at least the second UE, feedback comprising:

hybrid automatic retransmission request (HARQ) feedback regarding the first sidelink transmission, wherein the feedback comprises a value selected from a set of values that includes:

a first value that indicates the HARQ feedback comprises a negative acknowledgment (NACK) and a collision is undetected between the first resource reservation and the second resource reservation; and a second value that indicates the HARQ feedback comprises the NACK and the collision is detected between the first resource reservation and the second resource reservation.

30. A non-transitory computer-readable medium for wireless communications, comprising:

instructions that, when executed by one or more processors of a second user equipment (UE), cause the second UE to:

transmit a sidelink transmission to a first UE that indicates a first resource reservation; and receive feedback comprising:

hybrid automatic retransmission request (HARQ) feedback regarding the sidelink transmission, wherein the feedback comprises a value selected from a set of values that includes:

a first value that indicates the HARQ feedback comprises a negative acknowledgment (NACK) and a collision is undetected between the first resource reservation and a second resource reservation; and a second value that indicates the HARQ feedback comprises the NACK and the collision is detected between the first resource reservation and the second resource reservation.

* * * * *